United States Patent
Pan et al.

(10) Patent No.: US 12,411,243 B2
(45) Date of Patent: *Sep. 9, 2025

(54) SYSTEMS AND METHODS FOR LIGHT DETECTION AND RANGING

(71) Applicant: Hesai Technology Co., Ltd., Shanghai (CN)

(72) Inventors: Zhengqing Pan, Shanghai (CN); Shaoqing Xiang, Shanghai (CN); Yifan Li, Shanghai (CN); Kai Sun, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 551 days.

This patent is subject to a terminal disclaimer.

(21) Appl. No.: 17/731,411

(22) Filed: Apr. 28, 2022

(65) Prior Publication Data
US 2022/0299647 A1    Sep. 22, 2022

Related U.S. Application Data

(63) Continuation of application No. 17/555,655, filed on Dec. 20, 2021, now Pat. No. 11,573,327, which is a
(Continued)

(30) Foreign Application Priority Data

Dec. 8, 2017 (CN) .......................... 201711303228.8

(51) Int. Cl.
*G01S 17/894* (2020.01)
*G01S 7/4865* (2020.01)

(52) U.S. Cl.
CPC .......... *G01S 17/894* (2020.01); *G01S 7/4865* (2013.01)

(58) Field of Classification Search
None
See application file for complete search history.

(56) References Cited

U.S. PATENT DOCUMENTS 4,047,117 A    9/1977 Tuchyner et al.
4,128,759 A    12/1978 Hunt et al.
(Continued)

FOREIGN PATENT DOCUMENTS

CN    101373217 A    2/2009
CN    102200580 A    9/2011
(Continued)

OTHER PUBLICATIONS

EP20916044.9 Extended European Search Report dated Apr. 3, 2023.
(Continued)

*Primary Examiner* — Luke D Ratcliffe
(74) *Attorney, Agent, or Firm* — Wilson Sonsini Goodrich & Rosati

(57) ABSTRACT

A light detection and ranging system is provided for improving imaging accuracy and measurement range. The light detection and ranging system may comprise: a light source configured to emit a multi-pulse sequence into a three-dimensional environment, in which the multi-pulse sequence comprises multiple light pulses having a temporal profile; a photosensitive detector configured to detect light pulses returned from the three-dimensional environment and generate an output signal indicative of an amount of optical energy associated with a subset of the light pulses; and one or more processors electrically coupled to the light source and the photosensitive detector, and the one or more processors are configured to: generate the temporal profile
(Continued)

based on one or more real-time conditions; and determine one or more parameters for selecting the subset of light pulses.

19 Claims, 17 Drawing Sheets

Related U.S. Application Data continuation of application No. 16/805,061, filed on Feb. 28, 2020, now Pat. No. 11,346,952, which is a continuation of application No. PCT/CN2020/073629, filed on Jan. 21, 2020, and a continuation-in-part of application No. PCT/CN2018/119721, filed on Dec. 7, 2018.

(56) References Cited

U.S. PATENT DOCUMENTS

| | | | |
|---|---|---|---|
| 10,222,475 | B2 | 3/2019 | Pacala et al. |
| 10,466,342 | B1 | 11/2019 | Zhu et al. |
| 11,346,952 | B2 | 5/2022 | Pan et al. |
| 11,573,327 | B2 | 2/2023 | Pan et al. |
| 2013/0235366 | A1* | 9/2013 | Giacotto ............ G01S 17/10 356/5.01 |
| 2014/0233942 | A1* | 8/2014 | Kanter ............ G01S 7/4865 398/25 |
| 2016/0003946 | A1 | 1/2016 | Gilliland et al. |
| 2016/0266242 | A1 | 9/2016 | Gilliland et al. |
| 2017/0269197 | A1 | 9/2017 | Hall et al. |
| 2018/0081061 | A1 | 3/2018 | Mandai et al. |
| 2019/0018107 | A1* | 1/2019 | Warke ............ G01S 17/36 |
| 2019/0056497 | A1 | 2/2019 | Pacala et al. |
| 2019/0120942 | A1* | 4/2019 | Zhang ............ H01S 3/302 |

FOREIGN PATENT DOCUMENTS

| | | |
|---|---|---|
| CN | 102419435 A | 4/2012 |
| CN | 101414729 B | 3/2013 |
| CN | 103235314 A | 8/2013 |
| CN | 104359564 A | 2/2015 |
| CN | 104603634 A | 5/2015 |
| CN | 106154248 A | 11/2016 |
| CN | 205809286 U | 12/2016 |
| CN | 106772404 A | 5/2017 |
| CN | 206193241 U | 5/2017 |
| CN | 206450825 U | 8/2017 |
| CN | 107234336 A | 10/2017 |
| CN | 108089201 A | 5/2018 |
| CN | 109116331 A | 1/2019 |
| EP | 2708916 A2 | 3/2014 |
| EP | 2963445 A2 | 1/2016 |
| EP | 3070494 A1 | 9/2016 |
| GB | 2384126 A | 7/2003 |
| JP | 2016205884 A | 12/2016 |
| WO | WO-2013178847 A1 | 12/2013 |
| WO | WO-2016149118 A1 | 9/2016 |
| WO | WO-2019109997 A1 | 6/2019 |
| WO | WO-2021146954 A1 | 7/2021 |

OTHER PUBLICATIONS

PCT/CN2018/119721 International Search Report dated Jun. 13, 2019.
PCT/CN2020/073629 Search Report & Written Opinion dated Sep. 28, 2020.
U.S. Appl. No. 16/805,061 Notice of Allowance dated Apr. 12, 2021.
U.S. Appl. No. 16/805,061 Notice of Allowance dated Mar. 18, 2022.
U.S. Appl. No. 16/805,061 Office Action dated Jan. 28, 2021.
U.S. Appl. No. 16/805,061 Office Action dated Jul. 27, 2020.
U.S. Appl. No. 16/805,061 Office Action dated Oct. 29, 2021.
U.S. Appl. No. 16/805,061 Office Action dated Oct. 30, 2020.
U.S. Appl. No. 17/555,655 Notice of Allowance dated Oct. 5, 2022.
U.S. Appl. No. 17/555,655 Office Action dated May 6, 2022.
Yanbing et al. Pulse Saturation of APD Application Circuit and the Solution, Optical Instruments 31(1): 44-47 (2009).

* cited by examiner

SYSTEMS AND METHODS FOR LIGHT DETECTION AND RANGING

CROSS-REFERENCE

This application is a continuation of U.S. application Ser. No. 17/555,655, filed Dec. 20, 2021, which is a continuation of U.S. application Ser. No. 16/805,061, filed Feb. 28, 2020, which is a Continuation of International PCT Application No. PCT/CN2020/073629, filed on Jan. 21, 2020; and is a Continuation-in-Part of International PCT Application No. PCT/CN2018/119721, filed on Dec. 7, 2018, which claims the benefit of Chinese Application No. 201711303228.8, filed on Dec. 8, 2017, now Chinese Patent No. CN108089201B, issued Apr. 24, 2020, each of which is entirely incorporated herein by reference.

BACKGROUND OF THE INVENTION

Light detection and ranging (Lidar) technology can be used to obtain three-dimensional information of an environment by measuring distances to objects. A Lidar system may include at least a light source configured to emit a pulse of light and a detector configured to receive returned pulse of light. The returned pulse of light or light beam may be referred to as echo light beam. Based on the lapse time between the emission of the pulse of light and detection of returned pulse of light (i.e., time of flight), a distance can be obtained. The pulse of light can be generated by a laser emitter then focused through a lens or lens group. The returned pulse of light may be received by a detector located near the laser emitter. The returned pulse of light may be scattered light from the surface of an object.

The aforementioned light pulses may be used to detect obstacles within the field of view. In some situations, a dynamic range of the detector, signal-to-noise ratio or contrast ratio of the detected signal may be limited by stray light. Stray light in a Lidar system can be caused by various sources. For instance, transmission light may contaminate or interfere with the receiving of returned light pulses by the detector. Such contamination or interference may cause difficulties in recognizing the close distance echoes. For example, a small portion of emitted pulses (stray light) may be directly received by the detector such as Avalanche Photo Diode (APD) within the Lidar system, resulting in the detection circuit of the highly sensitive APD entering the nonlinear saturation region. When the detection circuit is saturated, the amplification of the waveform trailing of the stray light can be greater than the amplification of its top pulse, rendering an increase in the pulse width of the stray light pulses in the detection circuit. This may lead to the undesirable result that the laser pulse echo signal reflected by the near-field obstacle is submerged in the delayed waveform trailing of the stray light, and the location information of the near-field obstacle cannot be determined resulting in a measurement blind zone.

SUMMARY OF THE INVENTION

A need exists for a Lidar system for three-dimensional measurement with improved light ranging accuracy and efficiency. More specifically, a need exists for methods and systems capable of performing measurement for a near-field obstacle and reducing the blind zone that is caused by the stray light inside the Lidar.

The Lidar system as set forth in the present application addresses the above needs by utilizing a sequence of laser pulses with a temporal profile. This sequence of laser pulses allows a receiver or receiving device of the Lidar system to have an improved dynamic range. The receiver may comprise a detector with a high dynamic range that the Lidar system is capable of imaging with high imaging resolution and extended measurement range. For instance, the receiver may comprise a pulse-detection circuit that is configured to convert the optical signal to an electrical signal. The pulse-detection circuit may be configured to generate a sensor output signal by varying the amount of received photon energy that is converted into at least one electrical signal. Alternatively, when the electrical signal corresponds to a single light pulse, the pulse-detection circuit may generate a sensor output signal by accumulating different combinations of electrical signals for forming the sensor output signal. In some cases, the pulse-detection circuit may generate a sensor output signal which is indicative of an amount of optical energy associated with a selected subset of the returned light pulses. The amount of photon energy may be varied by varying the number/count of returned light pulses are accumulated for forming an output signal and/or varying the selection of a subset of the returned light pulses such that the corresponding total optical energy can be selected.

In some cases, the detector or photosensor may be configured to accumulate a selected subset of the returned modulated pulses that are received in an active region of the photosensor to form a sensor output signal. The sensor output signal may determine the intensity of a pixel in the 3D image. The intensity or a value of the pixel may be proportional to the amount of optical energy of the subset of light pulses accumulated by the photosensor or the pulse-detection circuit of the photosensor. In some cases, the intensity or the peak power of the output signal (e.g., voltage signal) may be adjusted dynamically in a pixel by pixel fashion. In some cases, the intensity or the peak power of the output signal may be individually adjustable for an active region of the detector or the entire detector.

In one aspect, the present disclosure may allow the detector to accumulate selected light pulses thereby providing a high-dynamic range detector. The predefined temporal profile may also beneficially prevent cross-talk among channels and improve measurement accuracy of obstacles in a near-filed. In some cases, the method may be used to generate a dual-pulse sequence. The method may generate the dual-pulse sequence by emitting a first laser pulse at a first time point; and emitting a second laser pulse at a second time point, in which a peak power of the first laser pulse is lower than that of the second laser pulse, a time interval between the second time point and the first time point is longer than T, and the T is a time length from a time point at which a laser pulse is emitted to a time point at which a laser pulse echo signal reflected by a near-field obstacle is received.

In some cases, a portion of the emitted laser pulses propagating through the imaging optics in the Lidar system can cause stray light to penetrate into adjacent channels or to be directly received by the detector such as Avalanche Photo Diode (APD) within the Lidar system, thereby causing inaccurate reading of the reflected light. As described above, when the detection circuit is saturated due to the stray light caused by an emitted laser pulse, the echo signal of the laser pulse received during such saturation state of the detector may be submerged in the delayed waveform trailing of the stray light. For example, the detection circuit of the detector may enter a nonlinear saturation region due to the stray light. When the detection circuit is saturated, the amplification of the waveform trailing of the stray light can be greater than the amplification of its top pulse, rendering an increase in the pulse width of the stray light pulses in the detection circuit, such that the laser pulse echo signal received during the saturation state of the detector can be submerged in the delayed waveform trailing of the stray light.

The signal contamination caused by stray light can be critical in near-field measurement. For instance, when the echo signals are returned from a near field (e.g., echo signals reflected by a near-field obstacle) where the corresponding the time delay is short (i.e., short distance or near-field), such echo signals may be received during the time window that detector is in the saturation state such that the location information of the near-field obstacle may not be correctly determined resulting in a measurement blind zone.

In a conventional Lidar system, a near field may correspond to a measurement blind zone since the echo signals from the near-field may not be correctly resolved due to the contamination of the stray light as described above. The term "near field" as utilized herein, generally refers to a space at a relatively short distance from the Lidar system. For example, a near field distance may be in a range of about between 5 and 50 meters. In some cases, the measurement blind zone caused by stray light contamination may depend on the sensitivity of the detector/sensor of the Lidar system and/or the reflectivity of the object. For instance, the time window of the saturation state of the detector may be based on the timing/intensity of the stray light and sensitivity of the detector. In a conventional Lidar system, the measurement blind zone caused by stray light contamination may correspond to a near-field distance (e.g., between 5 and 50 meters) that echo signals reflected off an object located in the near-field may be received during the time window of the saturation state of the detector. Similarly, the term "far field" (e.g., greater than 50 meters) as utilized herein may generally refer to the distance range that is greater than the distance corresponding to the near field.

In another aspect, a light detection and ranging system is provided for improving imaging accuracy and measurement range. The light detection and ranging system may comprise: a light source configured to emit a multi-pulse sequence into a three-dimensional environment, in which the multi-pulse sequence comprises multiple light pulses having a temporal profile; a photosensitive detector configured to detect light pulses returned from the three-dimensional environment and generate an output signal indicative of an amount of optical energy associated with a subset of the light pulses; and one or more processors electrically coupled to the light source and the photosensitive detector, and the one or more processors are configured to: generate the temporal profile based on one or more real-time conditions; and determine one or more parameters for selecting the subset of light pulses.

In some embodiments, the one or more processors are further configured to calculate a distance based on a time of flight associated with the subset of the light pulses, and the time of flight is determined by determining a match between the sequence of detected light pulses and the temporal profile. In some cases, the one or more parameters for selecting the subset of the light pulses are determined based on the distance between the Lidar system and an object located in the three-dimensional environment.

In some embodiments, the temporal profile comprises one or more members selected from the group consisting of amplitude of each pulse from the multiple pulses, duration of each pulse from the multiple pulses, time intervals among the multiple pulses and number of the multiple pulses. In some embodiments, the one or more parameters for selecting the subset of the light pulses are determined based at least in part on the temporal profile. In some embodiments, the one or more parameters comprise a number of light pulses in the subset or a parameter indicating a combination of non-consecutive light pulses.

In some embodiments, the one or more real-time conditions are obtained based on the detected light pulses. In some embodiments, the one or more real-time conditions comprise detection of an object located within a pre-determined distance threshold. In some embodiments, the one or more processors are further configured to generate a 3D image based on the output signal.

In a related yet separate aspect of the invention, a method for imaging using a light detection and ranging system is provided. The method may comprise: generating a temporal profile based on one or more real-time conditions; emitting a multi-pulse sequence into a three-dimensional environment, wherein the multi-pulse sequence comprises multiple pulses having the temporal profile; detecting light pulses from the three-dimensional environment; and generating an output signal indicative of an amount of optical energy associated with a subset of the light pulses.

In some embodiments, the method further comprises determining one or more parameters for selecting the subset of light pulses. In some cases, the one or more parameters for selecting the subset of the light pulses are determined based on a distance between the Lidar system and an object located in the three-dimensional environment. In some cases, the one or more parameters for selecting the subset of the light pulses are determined based at least in part on the temporal profile. In some cases, the one or more parameters comprise a number of light pulses in the subset or a parameter indicating a combination of non-consecutive light pulses.

In some embodiments, the method further comprises calculating a distance based on a time of flight associated with the detected light pulses. In some cases, determining the time of flight comprises determining a match between the sequence of detected light pulses and the temporal profile.

In some embodiments, the temporal profile comprises one or more members selected from the group consisting of amplitude of each pulse from the multiple pulses, duration of each pulse from the multiple pulses, time intervals among the multiple pulses and number of the multiple pulses.

In some embodiments, the one or more real-time conditions are obtained based on the detected light pulses. In some embodiments, the one or more real-time conditions comprise detection of an object located within a pre-determined distance threshold.

In some embodiments, the method further comprises generating a 3D image based on the output signal. In some cases, the output signal corresponds to an intensity value of a pixel in the 3D image.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure may be capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Features of the invention are set forth with particularity in the appended claims. A detailed understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
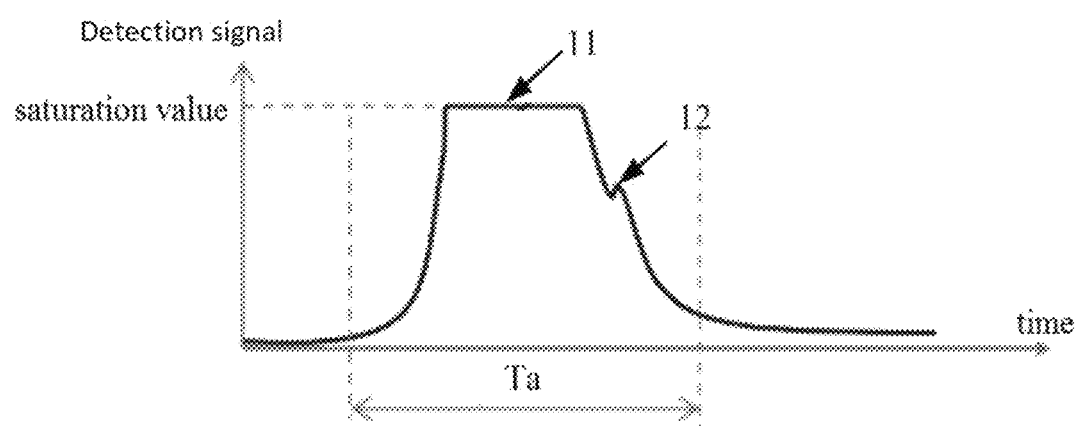
FIG. 1 shows an example of a detected signal contaminated by stray light.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Lidar is a type of ranging sensor characterized by long detection distance, high resolution, and low interference by the environment. Lidar has been widely applied in the fields of intelligent robots, unmanned aerial vehicles, autonomous driving or self-driving. The working principle of Lidar is estimating a distance based on a round trip time (e.g., time of flight or delay time) of electromagnetic waves between a source and a target.

As utilized herein, the term "multi-pulse sequence", may generally refer to a sequence of pulses or signals. Terms "measurement signals" and "measurement pulses" may generally refer to light pulses emitted from the emitting apparatus of the Lidar system unless context suggests otherwise. Terms "echo beams", may generally refer to return signals or pulses. A delay time may refer to the period of time between which the sequence of light pulses leaves the emitter and the reflected sequence of light pulses is received at the receiver. The delay time may then be used to compute a distance measurement. The delay time may also be referred to as time of flight which can be used interchangeably throughout the specification.

A sequence of light pulses may comprise multiple pulses emitted within short time duration such that the sequence of light pulses may be used to derive a distance measurement point. For example, Lidar can be used for three-dimensional (3D) imaging or detecting obstacles. In such cases, a distance measurement associated with a sequence of light pulses can be considered a pixel, and a collection of pixels emitted and captured in succession can be rendered as an image or analyzed for other reasons (e.g., detecting obstacles). A sequence of light pulses may be generated and emitted within a duration of, for example, no more than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 µs, 2 µs, 3 µs, 4 µs, 5 µs, or more. In some cases, the time intervals between consecutive sequences may correspond to the temporal resolution of 3D imaging. The time intervals among sequences may be constant or variable. In some embodiments, a sequence of light pulses is emitted from a light source that is steered or rotated by a rotor of the Lidar system or a scanner of the Lidar system. The time duration of the sequence may be short enough such that the multiple pulses are emitted along substantially the same direction in the 3D environment or can be used to measure a distance from the Lidar system to a particular location in the 3D environment.

In some cases, a multi-pulse sequence may be emitted to a spot in a 3D environment and a successive multi-pulse sequence may be emitted to a different spot in the 3D environment. In some cases, all of the pixels (e.g., distance measurements) are obtained using multi-pulse sequences. In some cases, a selected subset of pixels is obtained using multi-pulse sequences and the remaining pixels may be obtained using un-encoded signals (e.g., single light pulse). For example, a selected subset of pixels in 3D imaging may be obtained using encoded signals such that each pixel may be generated based on a multi-pulse sequence and another subset of pixels may be obtained using un-encoded signals such that each pixel may be generated using a single light pulse. In some cases, a selected portion of the returned multiple pulses in a sequence may be used for deriving a pixel value (e.g., intensity) and/or for calculating a distance.

In some embodiments, a multi-pulse sequence comprising light pulses may be used to improve the dynamic range of the detector, signal-to-noise ratio or contrast ratio of the detected signal that may otherwise be limited by stray light. Stray light in a Lidar system can be caused by various sources. For instance, transmission light may contaminate or interfere with the receiving of return beam by the detector. Such contamination or interference may cause trouble in recognizing the close distance echoes. For example, during the laser pulse emission a small portion of emitted pulses may be directly received by the detector such as Avalanche Photo Diode (APD), resulting in the detection circuit of the highly sensitive APD entering the nonlinear saturation region. When the detection circuit is saturated, the amplification of the waveform trailing of the stray light can be greater than the amplification of its top pulse, rendering an increase in the pulse width of the stray light pulses in the detection circuit, such that the laser pulse echo signal reflected by the near-field obstacle is submerged in the delayed waveform trailing of the stray light. The location of the near-field obstacle cannot be determined resulting in a measurement blind zone. A detector may be referred to as a photoreceiver, optical receiver, optical sensor, photodetector, photosensitive detector or optical detector which can be used interchangeably throughout the specification.

FIG. 1 shows an example of a detected return signal that is contaminated by stray light. As described above, when some of the emitted laser pulses are directly absorbed by the APD, the detection circuit may be saturated, thereby submerging the laser pulse echo signals reflected by the near-field obstacle, and forming a measurement blind zone.

As illustrated in FIG. 1, when laser pulses are emitted from an emitter of a Lidar system, a portion of the emitted laser pulse may be scattered or deflected inside the Lidar system and directly received by a detector. As shown in FIG. 1, the detection circuit of the detector has a saturation value, above which detected signals will be truncated to the saturation value. The detected (voltage) signals generated by the APD may include: a flat voltage segment 11 whose value corresponds to the saturation of the detection circuit. This flat segment 11 is caused by the direct adsorption of stray light by the APD. The detected signals in FIG. 1 also includes a laser pulse echo signal 12 caused by the reflection of the laser pulses by the near-field obstacle. Since the stray light directly adsorbed by the APD causes saturation of the detection circuit, the flat voltage segment 11 is equal to the voltage saturation value, which can be greater than the laser pulse echo signal 12 reflected by the near-field obstacle. As shown in FIG. 1, the echo signal 12 is detected at the edge of the detected signal and may still be detectable due to the small peak and valley of the echo signal 12. There are situations, the echo signal 12 shows up in the segment 11 thereby causing the echo signal 12 to be totally submerged and distance information for the near-field obstacle unable to be acquired. In this situation, a measurement blind zone is created. The duration of the saturation voltage signal caused by the stray light has a duration Ta which may be deemed as the duration of the measurement blind zone. In the duration Ta of the measurement blind zone, the detector cannot precisely detect the reflected laser pulse echo signals, such that the distance information of the obstacle cannot be obtained.

Conventional Lidar systems may adopt two technical solutions to solve the above problems: i. adopting a narrower emission pulse width to reduce the width of the measurement blind zone; and ii. using a fast adjustable gain amplifier to replace the original fixed gain amplifier after the avalanche photodiodes (APDs), which could appropriately reduce the gained saturation effect of the stray light, and reduce the width of the measurement blind zone by employing a small gain for the front strong reflected light and a large gain for the rear weak reflected light. The existing technical solutions have drawbacks. For example, the solution with the reduced emitted pulse width will bring about an increase of the detected band width. However, more radio frequency noises will be introduced, and the costs for emission units and detection units will soar. The solution with the adjustable gain amplifier is only an optimization for the amplification circuit after the APD of the detection circuit to improve the dynamic range without altering the gain inside the APD. Therefore, in most cases, due to the high gain of the APD, the signal of the stray light is already saturated within the APD, and the subsequent amplification circuit cannot solve the problems of the saturation effect of the APD itself and the blind zone caused therefrom.

In some embodiments of the present application, a multi-pulse sequence comprising a plurality of light pulses of various amplitudes may be utilized for removing a measurement blind zone. In some cases, the multi-pulse sequence may comprise a first laser pulse with a low peak power emitted at a first time point, and a second laser pulse with a high peak power emitted at a second time point. The multi-pulse sequence may be emitted along substantially the same direction or into a spot in a 3D space. Since the peak power of the first laser pulse is small, a stray light may not cause voltage saturation of a detection circuit, and a first laser pulse echo signal reflected by a near-field obstacle may be detected. Using light pulses of different amplitudes may effectively solving the problem of the measurement blind zone for the near-field obstacle caused by the stray light inside a Lidar while preserving the detection of a far-field obstacle using the second laser pulse which has a higher peak power.

Alternatively or in addition to, the multiple light pulses in a multi-pulse sequence may have the same amplitudes. The present disclosure may provide a method for emitting a multi-pulse sequence that has a predefined temporal profile. This may beneficially allow the detector to generate configurable sensor output signal by accumulating selected returned light pulses thereby providing a high-dynamic range detector. The predefined temporal profile may also beneficially prevent cross-talk among channels and improve measurement accuracy of obstacles in a near-field. In some cases, the multi-pulse sequence may be a dual-pulse sequence. The method for generating the multi-pulse sequence may comprise: emitting a first laser pulse at a first time point; and emitting a second laser pulse at a second time point, wherein a peak power of the first laser pulse is lower than that of the second laser pulse, a time interval between the second time point and the first time point is longer than T, and the T is a time length from a time point at which a laser pulse is emitted to a time point at which a laser pulse echo signal reflected by a near-field obstacle is received.

Figure 2:
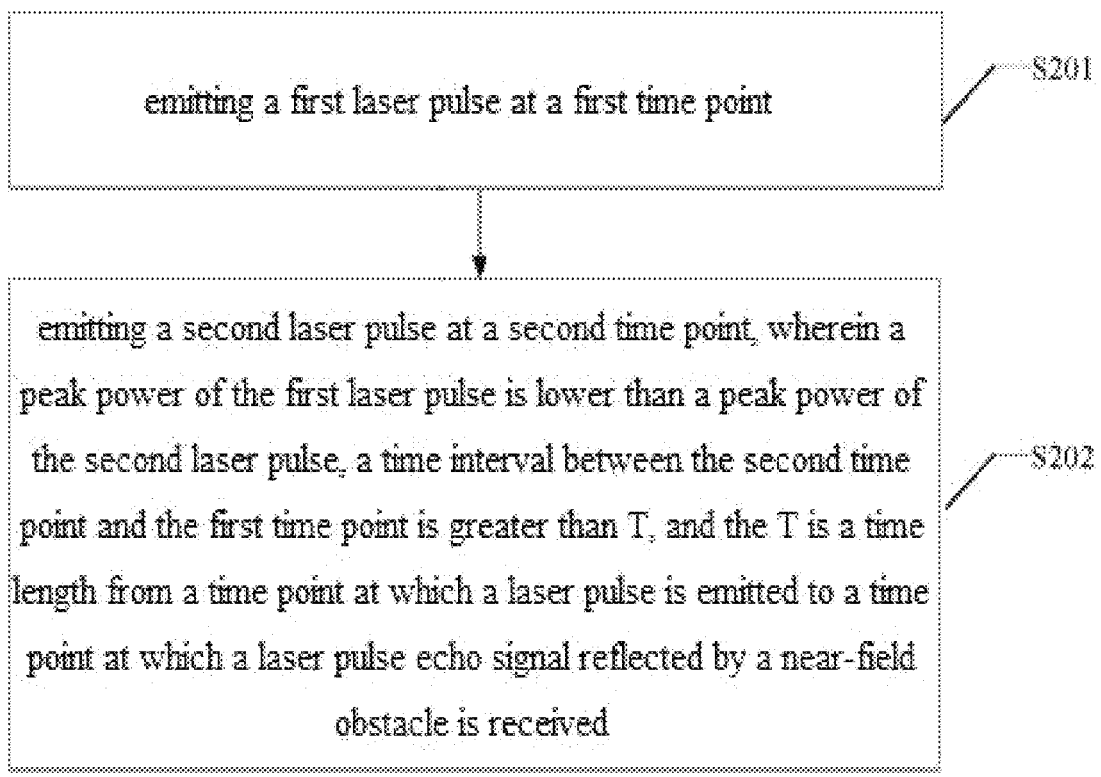
FIG. 2 shows a method of emitting a dual-pulse sequence, in accordance with some embodiments of the invention.

FIG. 2 shows a method of emitting a dual-pulse sequence, in accordance with some embodiments of the invention. The dual-pulse sequence may extend the measurement range to a near field at a low cost. The dual-pulse sequence may include laser pulses having different peak powers and a single dual-pulse sequence may correspond to a spot in space. The dual-pulse sequence may be used to generate a distance measurement. The method for emitting laser pulses may comprise: in step S201, emitting a first laser pulse at a first time point; and in step S202, emitting a second laser pulse at a second time point. In some cases, the peak power of the first laser pulse is lower than a peak power of the second laser pulse. In some cases, a time interval between the second time point and the first time point is greater than T, and the T is a time length from a time point at which a laser pulse is emitted to a time point at which a laser pulse echo signal reflected by a near-field obstacle is received.

In the conventional Lidar systems, since the emitted laser pulses are directly absorbed by the APD, the detection circuit is saturated, thereby submerging the laser pulse echo signals reflected by the near-field obstacle, and forming a measurement blind zone. The provided method of emitting dual pulses, i.e., emitting a weak first laser pulse at a first time point for near-field obstacle measurement, and emitting a strong second laser pulse at a second time point for far-field obstacle measurement may effectively avoid the measurement blind zone.

In some cases, since the weak first laser pulse can be used for the measurement of the near-field obstacle, in order to improve the accuracy of the near-field obstacle measurement, the time interval between the second time point and the first time point may be greater than a time interval T. The time interval T may be the delay time corresponding to the measurement of a near-field obstacle, i.e. the time length from the time point at which a laser pulse is emitted to the time point at which the echo signal of the same laser pulse reflected by the near-field obstacle is received. The time interval T may be pre-set value that corresponds to a distance measurement can be contaminated by the stray light. For instance, the value of T may be selected such that a return signal of the first laser pulse can be detected without submerged by the stray light of the second laser pulse. The value of T may be determined based on characteristics of the stray light of the second laser pulse and/or the typical range of TOF. For example, T may be in a range of 10 ns to 500 ns.

According to an embodiment of the Lidar system as set forth in the present application, a direct absorption by the APD of the stray light that is caused by the first laser pulse may not cause the APD to be saturated because of the low power of the first laser pulse. The subsequent pulse signal reflected by an obstacle in the 3D space may be effectively separated or distinguishable from the noise, thereby eliminating the measurement blind zone. Using light pulses of different amplitudes can effectively solving the problem of measurement blind zone for the near-field obstacle caused by the stray light inside a Lidar while preserving the detection of a far-field obstacle using the second laser pulse which has a higher peak power.

Figure 3:
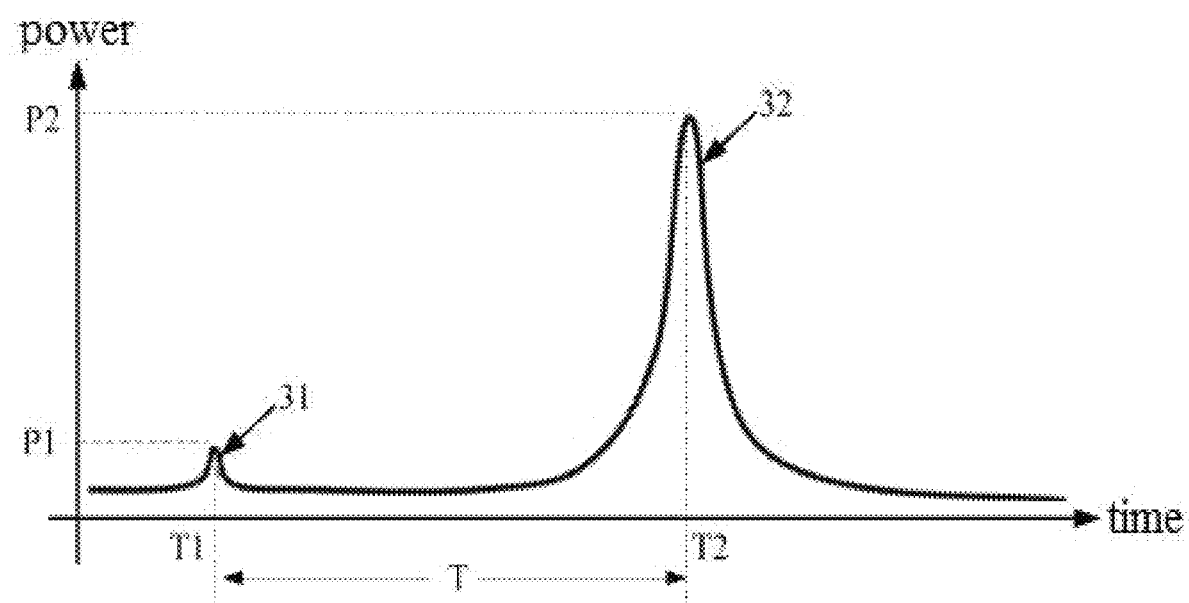
FIG. 3 shows an example of a multi-pulse sequence, in accordance with some embodiments of the invention.

FIG. 3 shows an example of a multi-pulse sequence, in accordance with some embodiments of the invention. The laser pulse may be a dual-pulse sequence comprising two pulses having different peak powers. As illustrated in FIG. 3, at the time point T1, a first laser pulse 31 may be emitted with a first peak power of P1, and at the time point T2, a second laser pulse 32 may be emitted with a second peak power of P2. In some cases, P2 may be greater than P1, such as at least ten times of P1, 20 times of P1, 50 times of P1, 100 times of P1, 200 times of P1, 500 times of P1 or greater. The time interval between T2 and T1 is T. The pulse width can be any typical range such as 1 ns–1000 ns. P1 can be any value that the corresponding stray light may not cause saturation of the photosensor whereas P2 may be a value that the corresponding stray light may cause saturation of the photosensor. For example, P1 may have a value no more than 20 W, 10 W, 1 W, 0.1 W or less. The value of P1 may be determined based on empirical data. For example, P1 may be determined in a calibration stage or a pre-operation stage where a range of peak power is generated, and the peak power causing a saturation of the APD may be determined. Next P1 may be a value selected no greater than the peak power causing the saturation of the APD. For instance, as P1 is low, the corresponding stray light may not cause the APD to be saturated, so that the echo signal of the first laser pulse 31 reflected by the near-field obstacle may be effectively separated from the detected stray light signal. The peak power of the second laser pulse 32 may be selected such that a measurement for a long distance can be enabled by a high laser peak power of the second laser pulse. For instance, the peak power of the second laser pulse may be selected to be sufficient for distance measurement in a far-field range. The echo signals corresponding to the far-field may be distinguishable (i.e., not submerged) from the waveform training of the stray light since the echo signals may be received after the saturation period of the detector (e.g., due to the greater TOF) and/or the amplitude of the echo signal is greater than the waveform trailing of the stray light. This may beneficially allow for detection of the far-field obstacle being performed without interference of the stray light.

Figure 4:
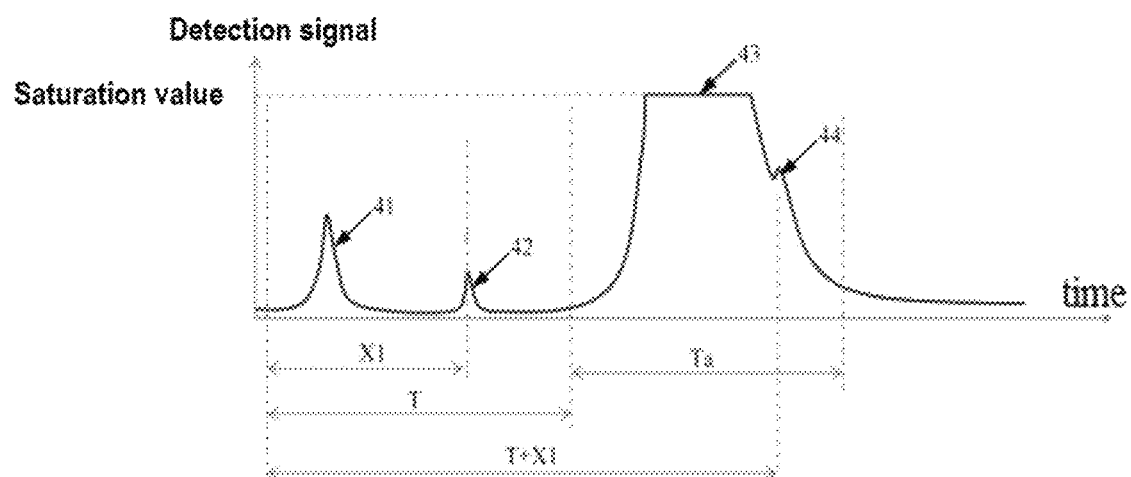
FIG. 4 shows an example of a detection signal generated by the Avalanche Photo Diode (APD), in accordance with some embodiments of the invention.

The dual-pulse sequence as shown in FIG. 3 may be emitted and the returned pulses may be received by a detector (e.g., Avalanche Photo Diode). The detector may output detection voltage signals that may be further processed for calculating distances or obtaining obstacle information in a wide distance range. FIG. 4 shows an example of a detection signal generated by the Avalanche Photo Diode (APD). The detected signal may represent returned pulses corresponding to the dual-pulse sequence as shown in FIG. 3. The detected signal may be voltage signals generated by APDs. The detection signal as shown in FIG. 4 may include a first voltage signal 41 caused by the stray light corresponding to the emitted first laser pulse 31, an echo signal 42 of the laser pulse 31 reflected by the obstacle located in the near-field, a second voltage signal 43 under which the detection circuit is saturated as a result of the stray light corresponding to the emitted second laser pulse 32 by the APD, and an echo signal 44 of the second laser pulse 32 reflected by the (same) obstacle located in the near-field. The time delay of the first laser pulse 31 being reflected by the near-field obstacle is represented as X1, the emission time interval between the second laser pulse 32 and the first laser pulse 31 is represented as T, a duration of the voltage signal 43 corresponding to a time window during which a returned lower peak power echo signal can be contaminated/submerged is represented as Ta. As described elsewhere herein, in some cases, this time window may correspond to a measurement blind zone in a conventional Lidar system. It should be noted that the measurement blind zone may refer to a saturation time window of the detector where the near-field measurement can be contaminated by stray light. The time duration Ta may refer to a measurement blind zone for a conventional Lidar system throughout the specification unless context suggests otherwise. In some cases, time interval T is greater than Ta, i.e., T>Ta, such that the return signal of the first laser pulse 31 may not be submerged by the saturation caused by the stray light of the second laser pulse, and the time delay of the second laser pulse 32 being reflected by the near field obstacle is T+X1. It is noted that the example is for illustration purpose only and the detection signals may have different profiles. For instance, the peak power of echo signal 41 may or may not be greater than the echo signal 42 due to the various characteristics of the Lidar system (e.g., detector sensitivity, optic elements in the system, etc.).

Figure 5:
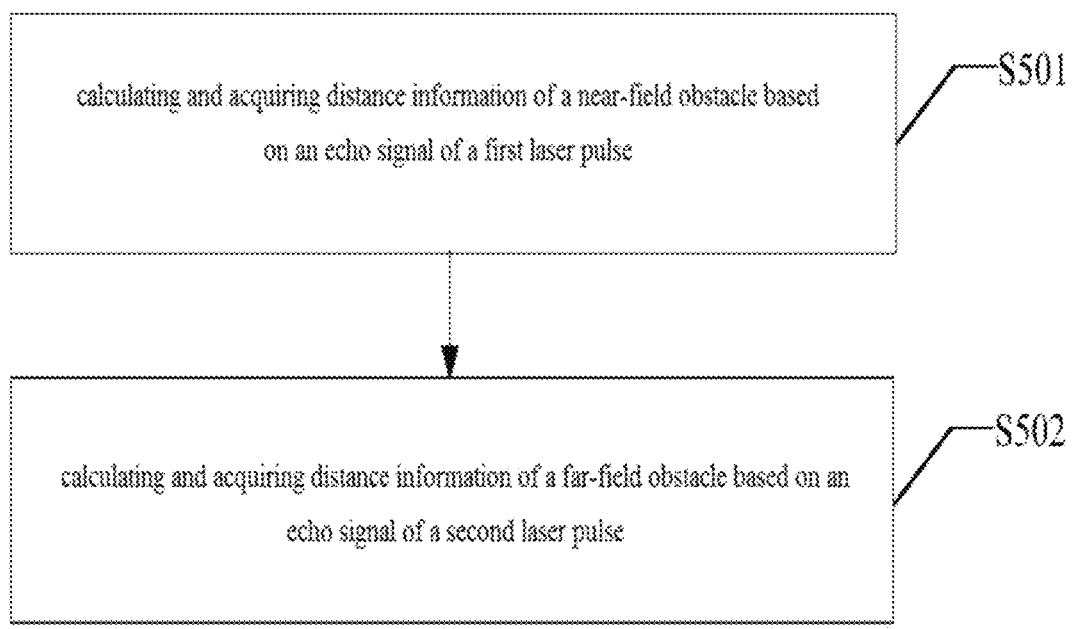
FIG. 5 illustrates an exemplary method for acquiring obstacle information, in accordance with some embodiments of the invention.

FIG. 5 shows an exemplary process for acquiring obstacle information, in accordance with some embodiments of the invention. In some cases, the process for acquiring obstacle information may comprise the following operations: calculating and acquiring distance information of a near-field obstacle based on an echo signal of a first laser pulse (operation S501); calculating and acquiring distance information of a far-field obstacle based on an echo signal of a second laser pulse (operation S502).

Due to the low power of the first laser pulse, even if the corresponding stray light is directly adsorbed by the APD system, the stray light may not cause the APD to be saturated, and the distance information of the near-field obstacle may be calculated and acquired. Concurrently, since the power of the second laser pulse signal is high and the delay time corresponding to a far-field obstacle is long enough to separate the actual returned signal (e.g., detection signal 44) from the corresponding stray light signal (e.g., detection signal 43), the distance information of the far-field obstacle may be calculated and acquired based on the echo signal of the second laser pulse.

Figure 5A:
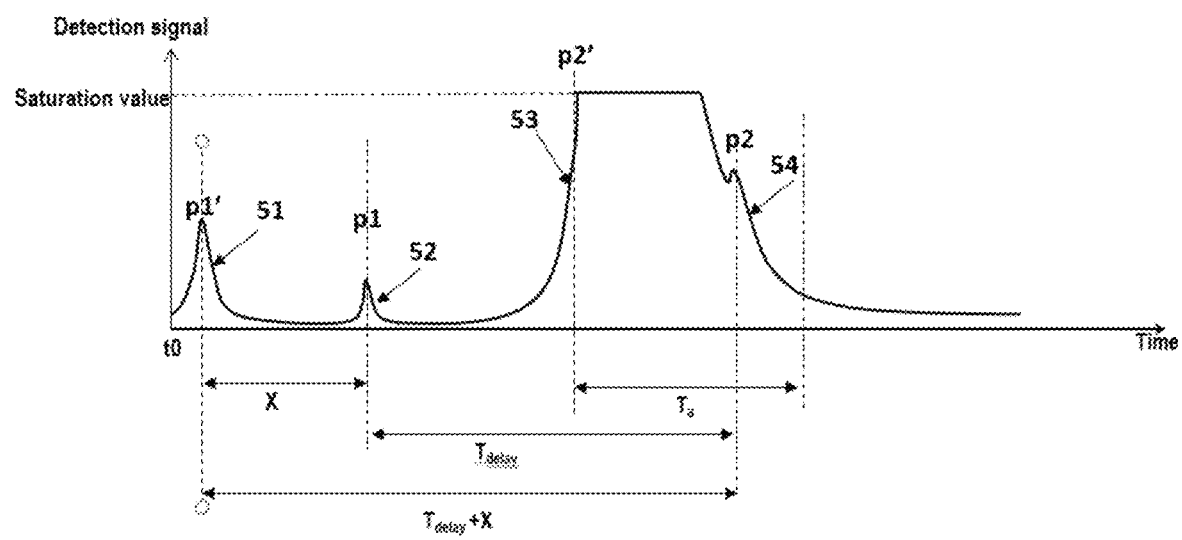
FIGS. 5A-5D show various measurement scenarios in which an accurate distance measurement can be achieved.
Figure 5B:
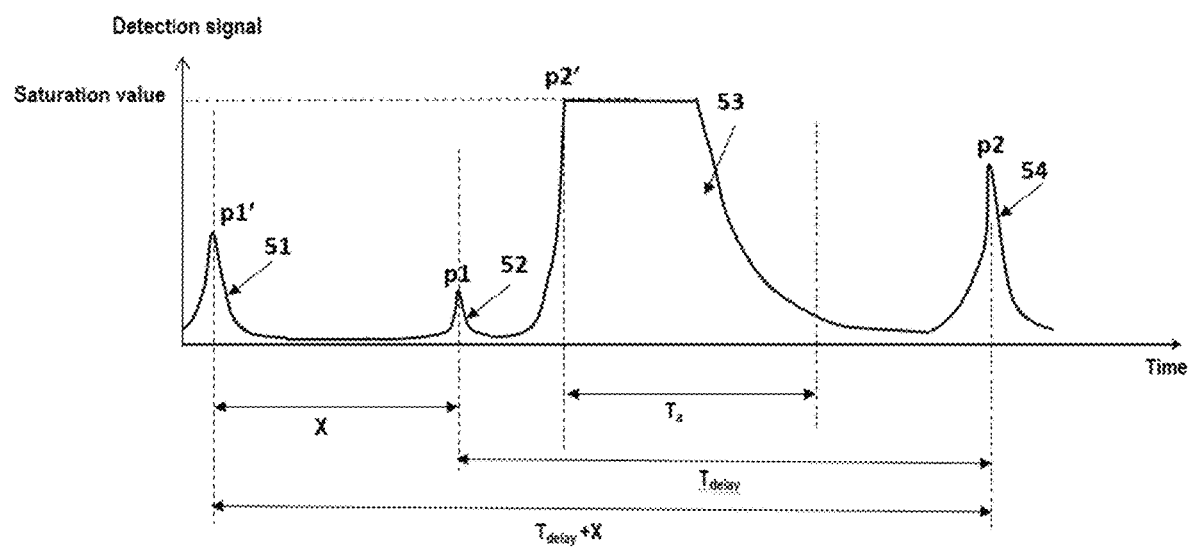
Figure 5C:
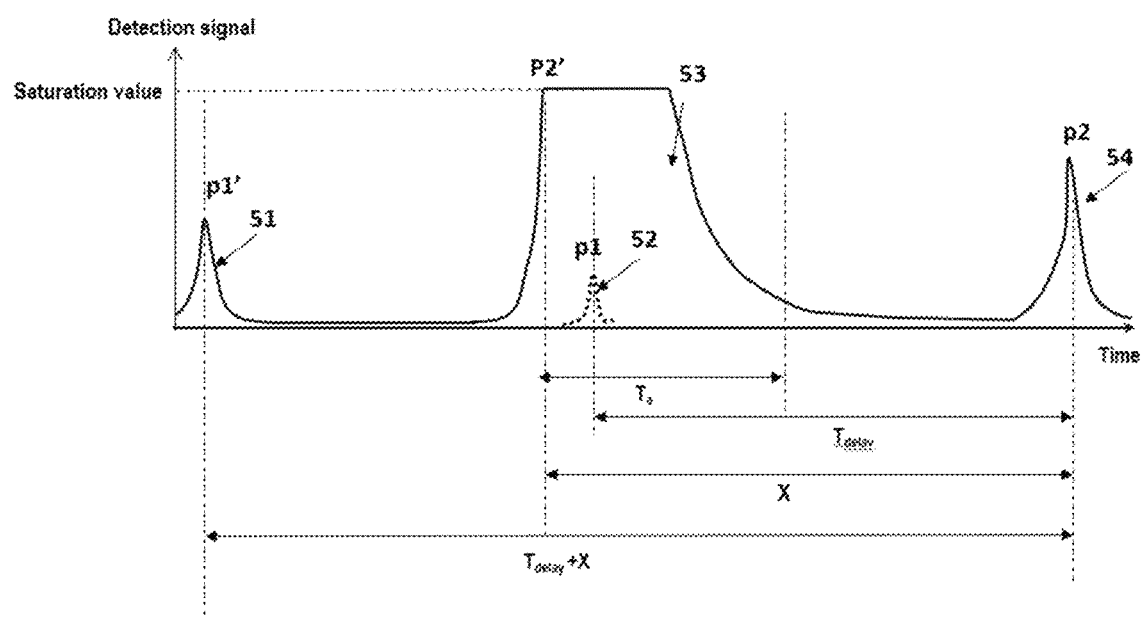
Figure 5D:
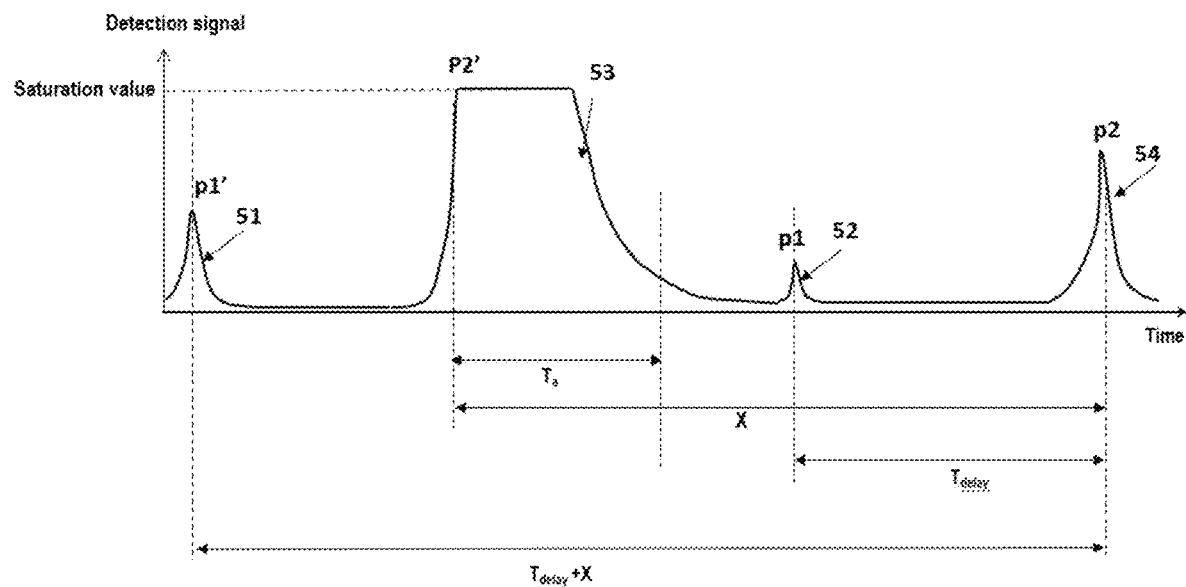

FIGS. 5A-D below illustrate the emitted laser pulses and detected return signals of each laser pulse when the laser pulses are pointed to an object that is moving from a near field to a far field location, respectively. In each figure, a dual-pulse sequence is emitted and directed to the object. In each figure, two emission pulses (p1' and p2') are shown and two return signals (p1 and p2) corresponding to each pulse reflected by the object are shown. The dual-pulse sequence includes an earlier emitted pulse p1' with a low power and a later emitted pulse p2' with a high power. As a result, the stray light of the second and high-powered laser pulse will cause the detector to be saturated and may cover/submerge the return signals depending on a relationship between the TOF of the measurement and the emission interval of the dual pulses, which will be discussed in the following part of the specification. FIG. 5A represents a first instance where the object is located close to the Lidar and the saturation time of the detector caused by the second laser pulse partially covers the return signal of the second pulse. FIG. 5B represents a second instance where the object moves farther away from the Lidar and the saturation time of the detector caused by the second laser pulse does not cover the return signal of any emitted pulses. FIG. 5C represents a third instance where the object moves even farther away from the Lidar and the saturation time of the detector caused by the second laser pulse submerges the return signal of the first pulse. FIG. 5D represents a fourth instance where the object is located very far from the Lidar and the saturation of the detector by the second laser pulse does not cover any of the return signals. The dual-pulse sequence and the corresponding measurement method may advantageously extend the measurement distance range and accommodate various scenarios.

FIG. 5A illustrates a scenario where the detection signal is returned from a near-filed object. In the illustrated example, the detection signal may be voltage signals generated by the Avalanche Photo Diode (APD). The detection signal may include the returned pulses corresponding to the dual-pulse sequence as shown in FIG. 3. The detection signal as shown in FIG. 5 may be substantially similar to the signals shown in FIG. 4. For instance, the detection signal may include a first voltage signal 51 caused by the stray light corresponding to the emitted first laser pulse (e.g., small laser pulse 31), an echo signal 52 of the laser pulse (e.g., small laser pulse 31) reflected by an obstacle located in the near-field, a second voltage signal 53 under which the detection circuit is saturated as a result of the stray light corresponding to the emitted second laser pulse (e.g., large laser pulse 32), and an echo signal 54 of the second laser pulse (e.g., large laser pulse 32) reflected by the same obstacle located in the near-field. The time delay (i.e., TOF) of the first laser pulse 51 being reflected by the near-field obstacle is represented as X which, in some cases, can be measured as the time delay between the peak values p1', p1, corresponding to the first voltage signal 51 and the second voltage signal 52, respectively. It is noted that the emission time of the laser pulse can use the time corresponding to the peak power of the stray light, the control signal for triggering the laser pulse or others. The difference of using different signals as the emission time may be a constant value and the time of delay can be measured using either signals (as the emission time) based on the Lidar system set up or calibration. The voltage signals corresponding to the stray light (e.g., voltage signal 51 and voltage signal 53) may be pre-known. For instance, such signals (e.g., timing, waveform, etc.) may be based on the optical system characteristics and the emission light pulse (e.g., amplitude) rather than the detection distance. The emission time interval between the second laser pulse 32 and the first laser pulse 31 is represented as $T_{delay}$ which can be a known value such as obtained from the signals triggering the laser pulses. The duration of the voltage signal 53 corresponding to the time length of the measurement blind zone is represented as Ta which may be obtained by processing the detection signal. In the illustrated near-filed scenario, the echo signal 52 of the first laser pulse is not submerged by the saturation caused by the second laser pulse and also has a signal-noise ratio greater than a pre-determined threshold, in this case the time delay X, i.e., time of flight corresponding to the first laser pulse can be used for measuring the distance.

In a second scenario, the dual-pulse sequence may be reflected by an obstacle located at a distance greater than that in the first scenario. FIG. 5B illustrates a second scenario wherein the echo signal 52 of the second laser pulse is not submerged by the saturation caused by the stray light of the second laser pulse. In the illustrated example, the echo signal 54 of the second laser pulse has a signal-noise ratio greater than that of the first echo signal 51, in this case the second laser pulse signal and the corresponding echo signal may be used for generating a distance measurement. For example, the time of flight X may be calculated by measuring the time interval $T_{delay}$+X between the first voltage signal 51 (e.g., peak value p1' of the detected signal 51) and the last detected signal, i.e., second echo signal 54 (e.g., peak value p2 of the detected signal 54), then subtracting the known $T_{delay}$ between the first laser pulse and the second laser pulse. Other suitable methods can also be used to obtain the time of flight based on the second laser pulse and the corresponding echo signal. For instance, the time of flight X may be calculated based on the time interval between the time points corresponding to the peak value p2' of the voltage signal 53 caused by the stray light and the peak value p2 of the second echo signal 54. In some cases, the time of delay X may be calculated for both the first and the second laser pulses and an average of the two may be used as the final output. Alternatively or in addition to, an SNR may be calculated for both echo signals and the time of delay X may be obtained using the signal with better SNR.

In a third scenario, the dual-pulse sequence may be reflected by an obstacle located at a distance greater than that in the first or the second scenario. FIG. 5C illustrates a third scenario where the echo signal 52 of the second laser pulse is submerged by the saturation caused by the stray light 53 of the second laser pulse. In this case, the second laser pulse signal and the corresponding echo signal may be used for generating a distance measurement. For example, the time of flight X may be calculated by measuring the time interval $T_{delay}+X$ between the first voltage signal 51 (e.g., peak value p1' of the voltage signal 51) and the last detected signal 54 (e.g., peak value p2 of the detected signal 54), then subtracting the known $T_{delay}$ between the first laser pulse and the second laser pulse. Other suitable methods can also be used to obtain the time of flight based on the second laser pulse and the corresponding echo signal. For instance, the time of flight X may be calculated based on the time interval between the time points corresponding to the peak value p2' of the voltage signal 53 caused by the stray light and the peak value p2 of the second echo signal 54.

In a fourth scenario, the dual-pulse sequence may be reflected by an obstacle located in the far-field. FIG. 5D illustrates a fourth scenario where both of the echo signals 52, 54 are not submerged by the saturation caused by the stray light. In this case, due to the far-field distance range, the echo signal 54 of the second laser pulse may have a signal-noise ratio greater than that of the first echo signal 51, and the second laser pulse signal and the corresponding echo signal may be used for generating a distance measurement. For example, the time of flight X may be calculated by measuring the time interval $T_{delay}+X$ between the first voltage signal 51 (e.g., peak value p1' of the detected signal 51) and the last detected signal 54 (e.g., peak value p2 of the echo signal 54), then subtracting the known $T_{delay}$ between the first laser pulse and the second laser pulse. Other suitable methods can also be used to obtain the time of flight based on the second laser pulse and the corresponding echo signal. For instance, the time of flight X may be calculated based on the time interval between the time points corresponding to the peak value p2' of the voltage signal 53 caused by the stray light and the peak value p2 of the second echo signal 54.

Figure 6:
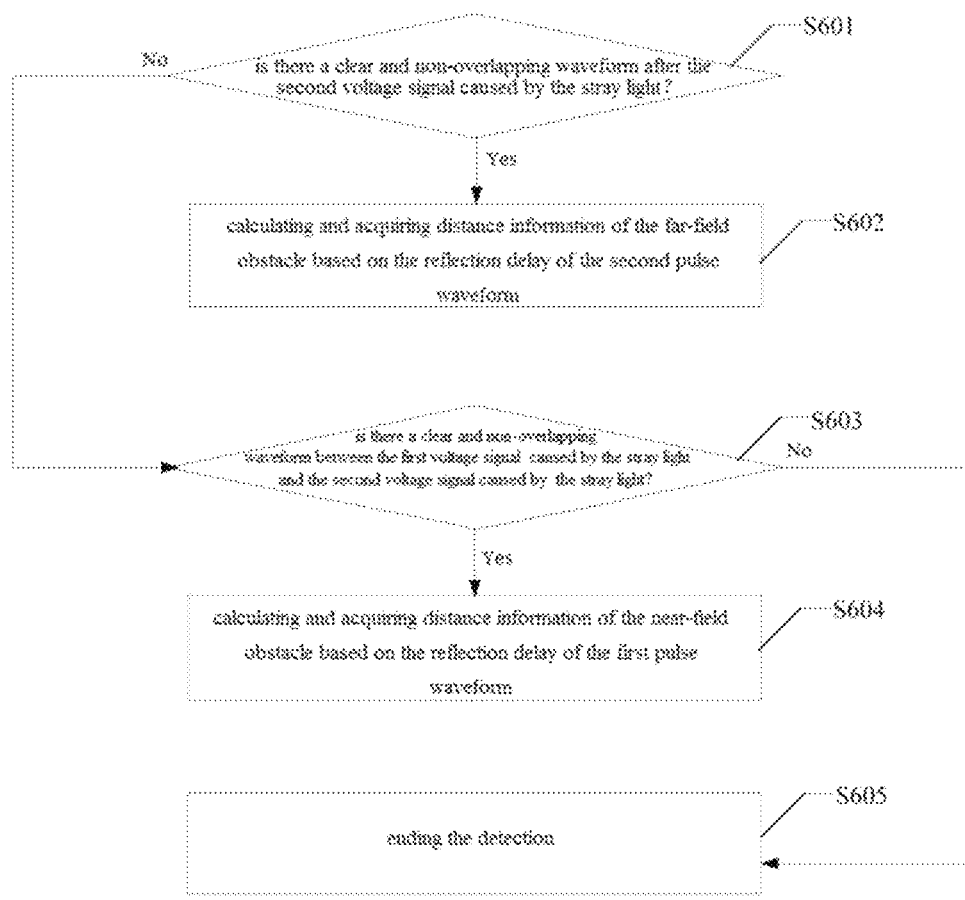
FIG. 6 illustrates a method of processing the detection signals for acquiring obstacle information, in accordance with some embodiments of the invention.

As illustrated above, the dual pulse sequence can be advantageously used for both near field and far field distance measurements. FIG. 6 illustrates an exemplary method of processing the detection signals for acquiring obstacle information in an extended distance range, in accordance with some embodiments of the invention. As described above, the voltage signal caused by stray light (e.g., voltage signal 51 and voltage signal 53) can be pre-known. For instance, the detection signals corresponding to the stray light (e.g., timing, waveform, etc.) may be based on the optical system characteristics and the emission light pulse (e.g., amplitude, triggering time, etc.) and may not vary according to the detection distance. For instance, the timing of the stray light signal and/or waveform of the stray light signals may be known at the system set up or calibration. Based on such information, the echo signals may be analyzed against the stray light signals (e.g., voltage signal 51 and voltage signal 53) and the correct distance can be computed. For instance, the signal processing algorithm may comprise detecting presence of one or two voltage signals (e.g., echo signals) relative to the voltage signals corresponding to the stray light, and based on the different presence scenarios, a qualified echo signal(s) or corresponding delay time can be determined. The various different presence scenarios can be the same as those discussed in FIG. 5A-5D. For instance, the various presence scenarios may comprise, one clear detection signal (e.g., signal 52 in FIG. 5A) exists between the two stray light signals (e.g., signals 51 and 53 in FIG. 5A) and no clear detection signals exist after the second stay light signal, one clear detection signal (e.g., signal 52 in FIG. 5B) exists between the two stray light signals (e.g., signals 51 and 53 in FIG. 5B) and one clear detection signal exists (e.g., signal 54 in FIG. 5B) after the second stay light signal, no detection signals exist between the two stray light signals (e.g., signals 51 and 53 in FIG. 5C) and one clear detection signal exists (e.g., signal 54 in FIG. 5C) after the second stay light signal, and no detection signals exist between the two stray light signals (e.g., signals 51 and 53 in FIG. 5C) and two clear detection signals exists (e.g., signal 54 in FIG. 5C) after the second stay light signal.

An example method for processing the detection signals in accordance with the aforementioned scenarios may comprise: determining the number of clear and non-overlapping waveforms after the signal corresponding to the stray light caused by the second light pulse (operation S601). If the number is two, then the method may proceed with calculating the distance using the process described in FIG. 5D (operation S602). If the number is one, then the method may proceed with determining if a waveform exists between the two stray light signals and if no waveform existed between the two stray light signals, then the distance may be calculated using the process described in FIG. 5C, otherwise, the distance may be calculated using the process described in FIG. 5B (operation S602). In operation S601, if no waveforms is detected after the second stray light signal, the method may proceed with determining if a clear and non-overlapping waveform exist between the two stray light signals (operation S603). If yes, then the distance may be calculated using the process described in FIG. 5A (operation S604), otherwise the process may be terminated (operation S605) and the corresponding detection signals may not be used for outputting a valid distance measurement.

Although FIG. 6 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. For instance, instead of detecting clear and non-overlapping waveforms after the second stray light signal in the first operation, the presence of the clear and non-overlapping waveforms between the two stray lights signals may be determined. The method may also be modified in accordance with other aspects of the disclosure as provided herein.

The presence of clear and non-overlapping waveforms can be detected using any suitable methods described elsewhere herein. For example, operation S601 may determine the presence of a clear signal after the second stray light signal. This operation may be performed by detecting one or more waveforms (e.g., with SNR greater than a pre-determined threshold) exist after T2 (e.g., the time point corresponding to the detection signal of the stray light caused by the second pulse such as 53 in FIG. 5A or FIG. 5B). A waveform can be determined to be a clear and non-overlapping waveform by examining the SNR, pulse width or other parameters of the detected waveform as described above. Upon determining the presence of two clear and non-overlapping waveforms, the method may proceed with calculating a distance using the processes described in FIG. 5D (operation S602).

As described above, if there is one clear signal or no clear signals detected after the second stray light signal, the method may proceed with determining if there is a clear signal exists between the two stray lights signals. This may be performed by detecting a waveform (e.g., with SNR greater than a pre-determined threshold) exists between T1 (e.g., the time point corresponding to the detection signal of the stray light caused by the first pulse, such as 51 in FIG. 5A or FIG. 5B) and T2 (e.g., the time point corresponding to the detection signal of the stray light caused by the second pulse such as 53 in FIG. 5A or FIG. 5B). Similarly, SNR, pulse width or other parameters of the detected waveform may be processed to determine if the waveform is a clear and non-overlapping waveform.

In some cases, in operation S602, the distance information of the far-field obstacle may be calculated and acquired based on the reflection delay of the second pulse waveform. In some cases, since the time delay of the second pulse waveform is related to the distance, the distance information of the far-field obstacle can be calculated and acquired based on the time delay of the second pulse waveform. In some cases, since the second laser pulse 32 is delayed by the time interval T relative to the first laser pulse 31, the time delay can be calculated based on T+X2 to obtain the distance information of the obstacle, where X2 is the time length between the time point of emitting the second laser pulse 32 and the time point of receiving the echo signal of the second laser pulse 32 reflected by the far-field obstacle.

In operation S603, the process may proceed with determining whether there is a clear and non-overlapping waveform between the first voltage signal 41 caused by the stray light and the second voltage signal 43 caused by the stray light. When a clear and non-overlapping waveform is determined, the method may proceed with operation S604, otherwise operation S605 may be performed which may end the detection iteration. In some cases, when there is no clear and overlapping waveform after the second voltage signal 43 caused by the stray light inside the Lidar system, it may suggest that there is no obstacle in the far field, and further analysis for existence of any obstacle in the near field may be conducted. When there is a clear and non-overlapping pulse waveform between the first voltage signal 41 caused by the stray light and the second voltage signal 43 caused by the stray light, it may suggest that there is an obstacle in the near field, and the pulse waveform is the first pulse waveform, which is the echo signal of the first laser pulse 31 reflected by the near-field obstacle.

In operation S604, the distance information of the near-field obstacle may be calculated and acquired based on the time delay of the first pulse waveform. In some cases, the time delay may be calculated based on X1 to obtain the distance information of the near-field obstacle, where X1 is the time length between the time point at which the first laser pulse 31 is emitted and the time point at which the echo signal of the first laser pulse 31 reflected by the near-field obstacle is received.

In some cases, when there is no clear and overlapping second pulse waveform after the second voltage signal 43 caused by the stray light inside the Lidar system, and there is no clear and non-overlapping first pulse waveform between the first voltage signal 41 caused by the stray light and the second voltage signal 43 caused by the stray light, the detection may end (operation S605), and the conclusion is that there is no obstacle in both the far field and the near field.

Figure 7:
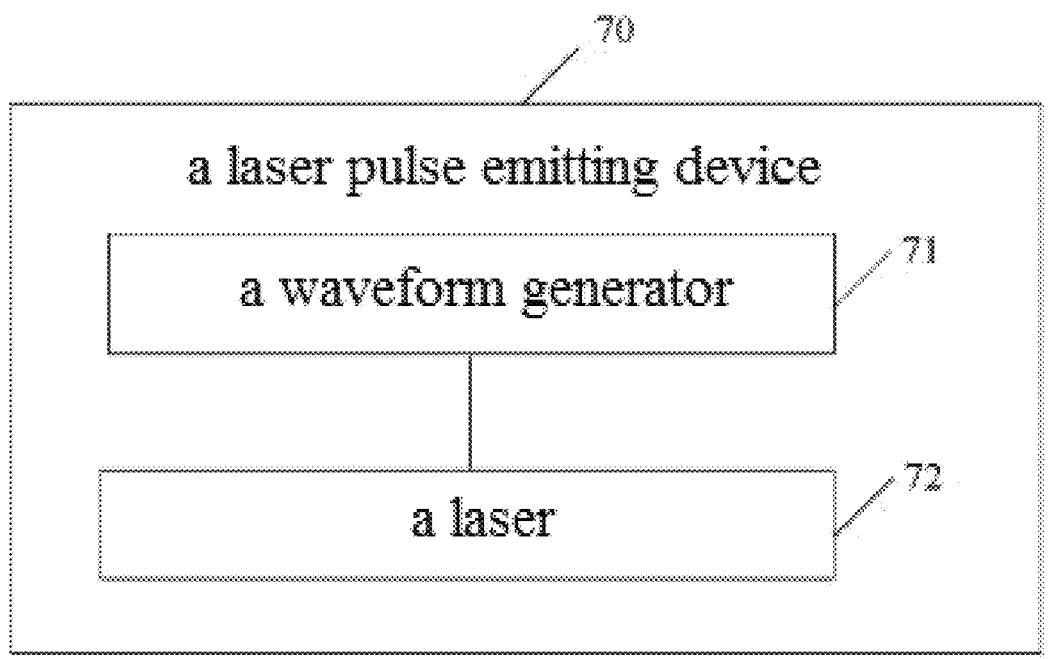
FIG. 7 schematically illustrates a structural diagram of a laser pulse emitting device, in accordance with some embodiments of the invention.

FIG. 7 schematically shows a functional diagram of a laser pulse emitting device 70, in accordance with some embodiments of the invention. The laser pulse emitting device may also be referred to as emitting device or emitting module which are used interchangeably throughout the specification. As shown in FIG. 7, the laser pulse emitting device 70 may comprise a waveform generator 71 and a laser 72 coupled thereto. In some embodiments, the waveform generator 71 may be adapted to output a first driving current to the laser 72 at a first time point and a second driving current to the laser 72 at a second time point, wherein a current value of the second driving current may be greater than a current value of the first driving current. In some cases, a time interval between the second time point and the first time point may be greater than T, where T is a time length from a time point at which a laser pulse is emitted to a time point at which a laser pulse echo signal reflected by a near-field obstacle is received.

The laser 72 may be configured to generate and emit a first laser pulse at the first time point based on the first driving current input by the waveform generator 71; and generate and emit a second laser pulse at the second time point based on the second driving current input by the waveform generator 71. In some cases, the laser may be a semiconductor laser or other types of lasers.

Figure 8:
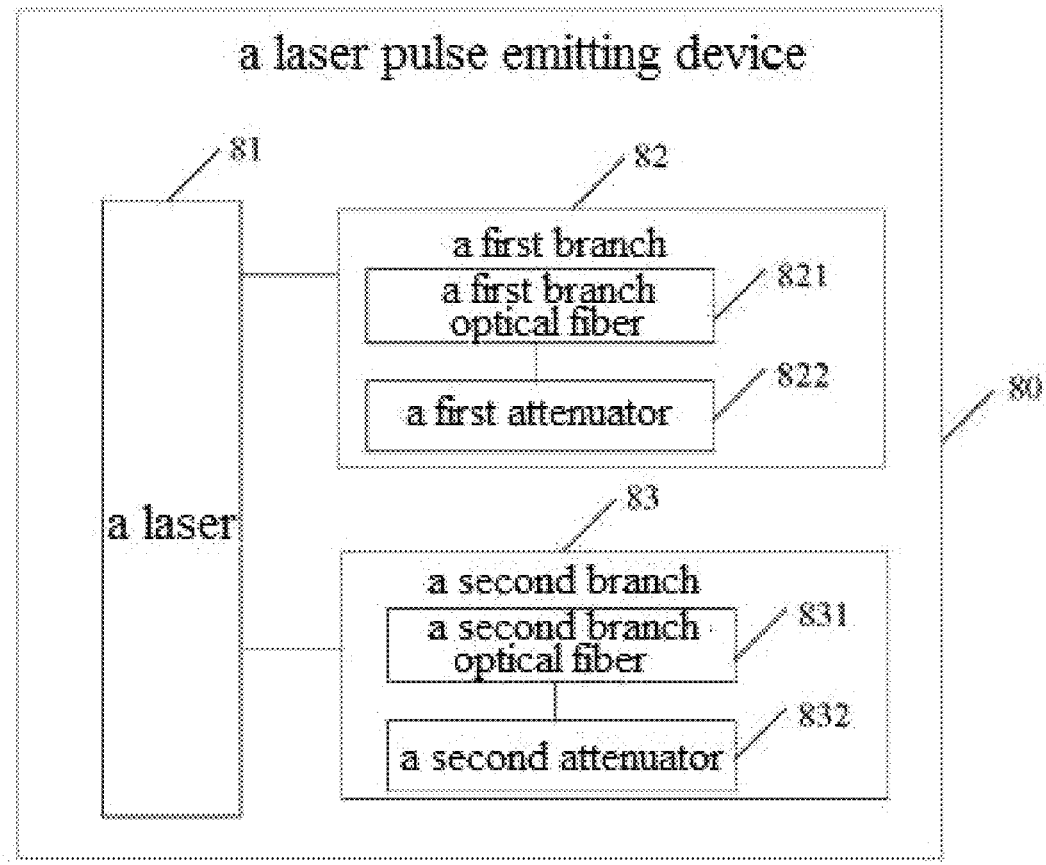
FIG. 8 schematically shows a diagram of an exemplary laser pulse emitting device, in accordance with some embodiments of the invention.

FIG. 8 schematically shows a diagram of an exemplary laser pulse emitting device 80, in accordance with some embodiments of the invention. As shown in FIG. 8, the laser pulse emitting device 80 may comprise a laser 81, and a first branch 82 and a second branch 83 coupled thereto. In some cases, the first branch 82 may comprise a first branch optical fiber 821 and a first attenuator 822 coupled to each other. The second branch 83 may comprise a second branch optical fiber 831 and a second attenuator 832 coupled to each other. In some cases, an attenuation value of the second attenuator 832 may be smaller than an attenuation value of the first attenuator 822. In some cases, a delay introduced by the second branch optical fiber 831 may be greater than a delay introduced by the first branch optical fiber 821, a delay time interval is represented as T, and the T is a time length from a time point at which a laser pulse is emitted to a time point at which a laser pulse echo signal reflected by a near-field obstacle is received. The laser 81 may be a semiconductor laser or any other suitable types of lasers.

Figure 9:
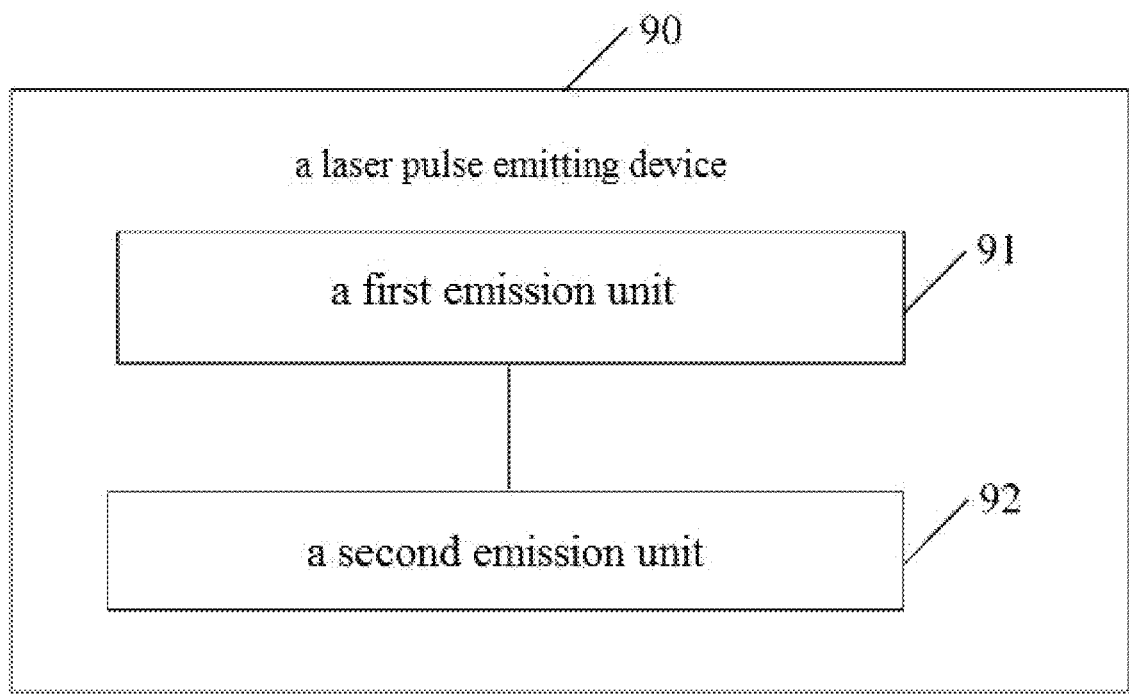
FIG. 9 schematically shows an example of a laser pulse emitting device, in accordance with some embodiments of the invention.

FIG. 9 schematically shows an example of a laser pulse emitting device 90, in accordance with some embodiments of the invention. As shown in FIG. 9, the laser pulse emitting device 90 may comprise a first emission unit 91 and a second emission unit 92. In some embodiments, the first emission unit 91 may be configured to emit a first laser pulse at a first time point. The second emission unit 92 may be configured to emit a second laser pulse at a second time point. In some cases, a peak power of the first laser pulse may be lower than a peak power of the second laser pulse. In some cases, a time interval between the second time point and the first time point may be greater than T, and the T is a time length from a time point at which a laser pulse is emitted to a time point at which a laser pulse echo signal reflected by a near-field obstacle is received.

As described above, a multi-pulse sequence emitted by the emitting device may be reflected by obstacles in the three-dimensional environment and returned to the detector. In some cases, the delay time interval or time of flight associated with the sequence of detected light pulses may be the average of the time of flight associated with each detected light pulse.

In some cases, a receiving module of the Lidar system may include one or more avalanche photodiodes (APDs) or one or more single-photon avalanche diodes (SPADs). In some cases, a receiving module may include a photosensor such as one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions). The photosensor may be a single photodetector capable of detecting photons, e.g., an avalanche photodiode, a SPAD, RCP (Resonant Cavity Photo-diodes), and the like, or several photodetectors, such as an array of SPADs, cooperating together to act as a single photosensor, often with higher dynamic range, lower dark count rate, or other beneficial properties as compared to a single large photon detection area. Each photodetector can be an active area that is capable of sensing photons, i.e., light. In some situations, performance of the receiving module such as dynamic range of the detector, signal-to-noise ratio or contrast ratio of the detected signal may be limited by stray light.

Lidar system of the present disclosure may provide a detector with improved dynamic range, signal-to-noise ratio and accuracy that can adapt to measurements in an extended distance range. In some cases, the high dynamic range may be achieved by using a pulse with a low peak power for near-field measurement and a pulse with high peak power for far-field measurement. Alternatively or in addition to, the high dynamic range may be achieved by collecting fewer pulses from shorter distances, thereby lowering the overall intensity level of the detection signals to near-field scenery and avoiding high-intensity reflections from very close objects.

In some cases, the echo pulse-detection circuit may be configured to convert received photon energies into a plurality of parallel electrical signals, combine a subset of the plurality of parallel electrical signals, and output the combined electrical signals as a sensor output. Alternatively, when the electrical signal corresponds to a single light pulse, the pulse-detection circuit may generate a sensor output signal by accumulating different combinations of electrical signals for forming a sensor output signal. In some cases, the pulse-detection circuit may generate a sensor output signal which is indicative of an amount of optical energy associated with a selected subset of the returned light pulses. The amount of photon energy may be configurable or can be adjusted by varying the number/count of returned light pulses that are accumulated for forming an output signal and/or varying the selection of a subset of the returned light pulses such that the corresponding total optical energy can be selected.

In some cases, the measurement light pulses or emitting light pulses may be modulated with a pre-determined temporal profile. A Lidar system according to an embodiment of the present application may have a photosensor. The photosensor having an array of pixels for generating a 3D image may be configured to accumulate a selected number of modulated pulses received in an active region of the photosensor to form a sensor output signal. The sensor output signal may determine the intensity of a pixel in the 3D image and the intensity may be determined by the amount of optical energy or light pulses accumulated during a time window. The intensity or the amplitude of the output signal may be adjusted dynamically in a pixel by pixel fashion. In some cases, the intensity or the amplitude of the output signal may be individually adjustable for an active region of the detector. The receiving module of the Lidar system may comprise a processing unit that is configured to read the sensor output signal resulting from the accumulated burst of returned pulse portions and generate the image and/or related image data based on the sensor output signal.

Figure 10:
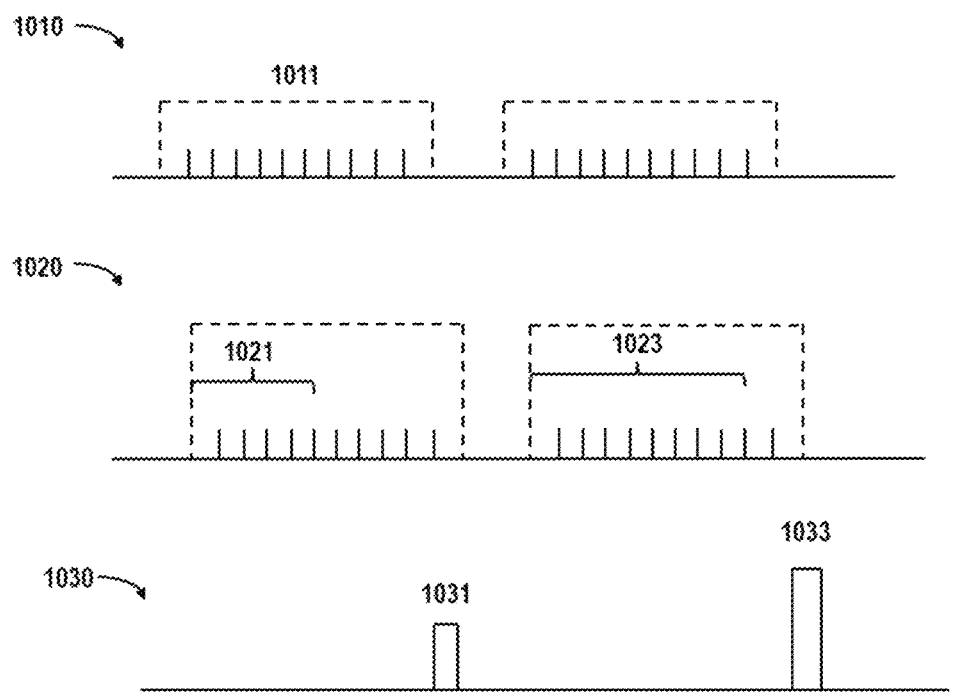
FIG. 10 shows an example of accumulating a selected subset of pulses in a returned multi-pulse sequence to form a sensor output signal.
Figure 11:
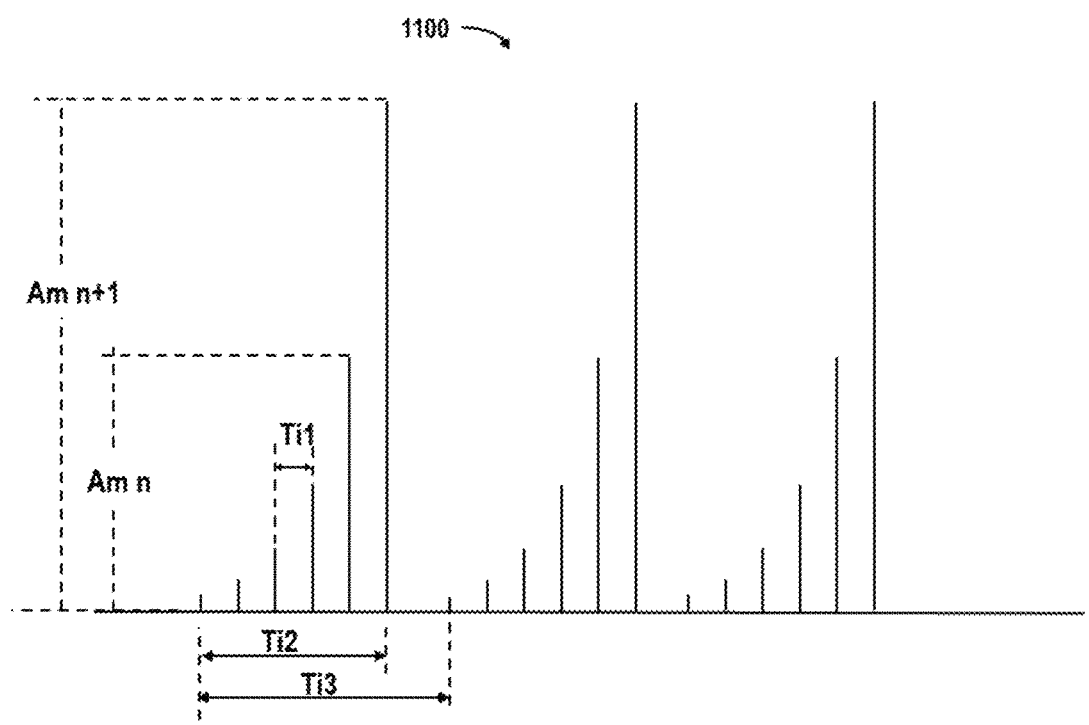
FIG. 11 shows an example of multi-pulse sequence with varied peak power.

FIG. 10 shows an example of accumulating a subset of returned pulses selected from a returned multi-pulse sequence 1020 to form a sensor output signal 1030. A multi-pulse sequence 1011 may comprise multiple pulses. The multi-pulse sequence 1011 may be laser pulses emitted from the emitting device of the Lidar system. A multi-pulse sequence may be emitted to a spot in a 3D space or emitted along substantially a same direction. The multi-pulse sequence or at least a portion of the multi-pulse sequence may be used to generate a measurement signal. In some cases, a multi-pulse sequence may be an encoded sequence (of pulses) modulated according to a pre-determined temporal profile. FIG. 11 shows another example of multi-pulse sequence 1100 with varied peak power. A multi-pulse sequence may comprise any number of pulses. For example, at least one, two, three, four, five, six, seven, eight, nine, ten or more pulses may be generated within a short period of time T12 and form a multi-pulse sequence. The duration of T12 may be, for example, no more than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, or more. The duration T12 of different multi-pulse sequences may or may not be the same. In some cases, the duration T12 of consecutive multi-pulse sequences can be different. The number of pulses in successive multi-pulse sequences may or may not be the same.

In FIG. 11, the time interval T11 between every two consecutive pulses within a multi-pulse sequence may or may not be constant. The time interval can be, for example, no more than 1 ns, 5 ns, 10 ns, 20 ns, 30 ns, 40 ns, 50 ns, 60 ns, 70 ns, 80 ns, 90 ns, 100 ns, 200 ns, or more. The time interval T11 within a multi-pulse sequence may vary according to the temporal profile. For instance, the time interval between the first pulse and second pulse may be different from the time interval between the second pulse and the third pulse.

The multiple pulses may have varied amplitude (e.g., Am n, Am n+1) 1100 or constant amplitude within a multi-pulse sequence 1011. In some cases, an amplitude or intensity of the pulses may be generally lower level such that the accumulation of a selected subset of returned pulses may not oversaturate the detector.

In some cases, the subset of returned pulses may be selected based on one or more parameters. The one or more parameters may determine an amplitude or intensity of a sensor output signal. The one or more parameters may be generated by a computing unit such as a controller of the Lidar system. In some cases, one or more parameters may be generated based on the temporal profile of the multi-pulse sequence and one or more real-time conditions. As described above, the temporal profile of a sequence may be defined by the number of pulses, time intervals (e.g., T11), duration of the sequence (e.g., T12), amplitude of the pulses, or a combination thereof in a sequence. The one or more real-time conditions may comprise an estimated measurement range, an object detected in the near field and the like. In some cases, the number of pulses or selection of pulses accumulated for forming a signal may be determined based on the detection range. For example, greater number of pulses may be accumulated for measurement of a long distance object (e.g., object located in far field) since the echo signals reflected from a far field tend to be weak whereas smaller number of pulses may be accumulated for measurement in a short distance (e.g., object located in near field) or higher reflection scenario since echo signals from a near field or high-reflection surface tend to be strong. This may beneficially improve SNR of the sensor output signal regardless of the measurement distance range.

The one or more parameters may comprise, for example, a parameter indicative of a selected subset of pulses. For instance, the one or more parameters may comprise the number of pulses accumulated for forming a sensor output signal or a parameter indicating a combination of pulses selected for forming a sensor output signal. The one or more parameters can include any other factors (e.g., a time window during which returned light pulses are received) that may determine the total optical energy of the selected subset of pulses. For example, when the multiple pulses in a multi-pulse sequence have constant amplitude, the amount of optical energy converted to a sensor output signal may be determined by the number of pulses. For instance, as shown in FIG. 10, a number/count of the returned light pulses 1020 may be selected and accumulated for forming a sensor output signal. The number/count of light pulses selected from an individual multi-sequence 1021, 1023 may be individually controlled such that the sensor output signal 1030 may have adjustable amplitude/intensity 1031, 1033. In some cases, when the multiple pulses in a multi-pulse sequence have varied amplitude, the amount of optical energy converted to a sensor output signal may be determined by selecting a combination of pulses from the returned light pulses. For instance, as shown in FIG. 11, the amplitude of light pulses in the sequence 1100 may have a pre-determined relationship such as the successive light pulse's amplitude is twice of the prior light pulse (e.g., Am n+1/Am n=2). In such case, by selecting different combinations of light pulses, accumulated amount of optical energy of numerous values can be formed. The subset of light pulses selected for forming a sensor output signal may or may not be consecutive train of light pulses. For instance, non-consecutive light pulses can be selected for forming a sensor output signal.

The temporal profile may be pre-determined and may not change along with time such that the detection range and/or measurement accuracy may be enabled by varying the amount of optical energy used for forming an output signal. Alternatively or in addition to, the emitted light pulses may be dynamically adjusted according to one or more real-time conditions. In some cases, the temporal profile may be dynamically adjusted based on one or more real-time conditions. The methods and systems for providing a dynamic temporal profile can be the same as those described in U.S. Pat. No. 10,466,342, filed on Oct. 30, 2018, the content of which is entirely incorporated herein by reference.

The one or more parameters that determine the selection of a subset of return signals for forming a sensor read-out may be pre-set. Alternatively or in addition to, the one or more parameters may be determined dynamically according to one or more real-time conditions such as an estimated/target measurement range (e.g., near-field obstacle detection or imaging, far-field obstacle detection or imaging), a change of temporal profile of the emitted signals, eye safety restriction and various other factors.

Figure 12:
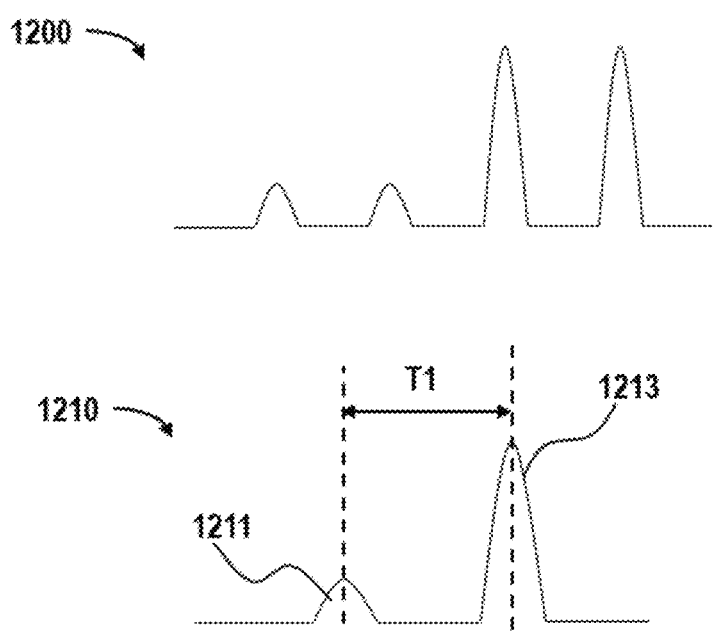
FIG. 12 shows a configurable multi-pulse sequence that is adaptive to eye safety requirement.

In some cases, in order to meet the constraint prescribed for eye safety, the emitting device of the Lidar system may be configured to adjust the instantaneous laser pulse energy, for controlling a maximum amount of energy during a certain time-period. FIG. 12 shows a configurable multi-pulse sequence that is adaptive to comply with eye safety requirements. For example, as illustrated in FIG. 12, multi-sequence 1200, 1210 comprising at least one light pulse 1211 with a low peak power and a light pulse 1213 with a higher peak power may be generated. The two light pulses 1211, 1213 may be separated by a time interval greater than a pre-determined time threshold (e.g., 10 ns) such that when an object is detected within a distance (e.g., 1.5 m) corresponding to the time threshold, the second light pulse 1213 with the higher amplitude may not be fired.

Figure 13:
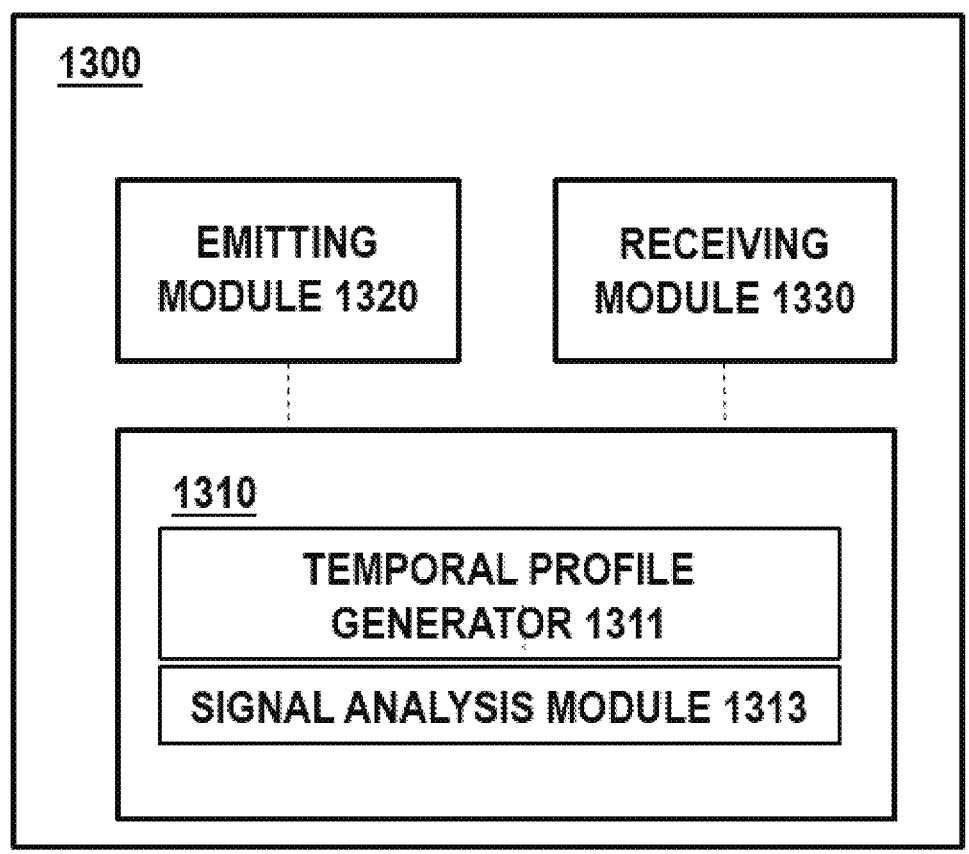
FIG. 13 schematically shows a block diagram of a Lidar system, in accordance with some embodiments of the invention.

FIG. 13 schematically shows a block diagram of a Lidar system 1300, in accordance with some embodiments of the invention. The Lidar system 1300 may comprise a high dynamic range receiving module 1330 and an emitting module 1320 that is capable of generating multi-pulse sequences having a pre-determined temporal profile. A delay time may refer to the period of time between which the sequence of light pulses leaves the emitter and the reflected sequence of light pulses is received at the receiver. The delay time may then be used to compute a distance measurement. The delay time may also be referred to as time of flight.

As described above, a sequence of light pulses may comprise multiple pulses emitted within a short time duration such that the sequence of light pulses may be used to derive a distance measurement point. For example, the provided Lidar system 1300 can be used for three-dimensional (3D) imaging or detecting obstacles. In such cases, a distance measurement associated with a sequence of light pulses can be considered a pixel, and a collection of pixels can be rendered as an image or analyzed for other reasons (e.g., detecting obstacles). In some cases, the time intervals between consecutive sequences may correspond to the temporal resolution of 3D imaging. The time duration of the sequence may be short enough such that the multiple pulses are emitted along substantially the same direction. In some cases, a selected portion of returned signal corresponding to the multiple pulses in a sequence may be used to compute a distance from the Lidar system to a particular location in the 3D environment. For example, a dual-pulse sequence including pulses having different peak powers may be used for measurement in different measurement ranges. The method for generating and processing the dual-pulse sequence is well described above (e.g., FIG. 2-FIG. 6). In some cases, a selected portion of the returned signals corresponding to the multiple pulses may be accumulated to generate a read-out (e.g., a measurable output voltage pulse) of the detector and form a pixel value. In some cases, the portion of returned signals may be selected according to the estimated or target measurement range, level of noise (e.g., caused by stray light), or temporal profile the emitted light pulses such that saturation of the detector or measurement in the blind zone can be avoided and the measurement accuracy may be improved.

In some embodiments, a sequence of light pulses or multiple sequences of light pulses may be generated according to a temporal profile. As shown in FIG. 13, the Lidar system 1300 may comprise an emitting module 1320, a receiving module 1330, a control unit 1310 comprising a temporal profile generator 1311 and a signal analysis module 1313. The emitting module 1320 may be in communication with the temporal profile generator 1311. The emitting module 1320 may be configured to emit light pulses conforming to the temporal profile generated by the temporal profile generator 1311. The receiving module 1330 may comprise a detector and various other optical components configured to detect or collect returned light pulses or signals. The detected signals may be processed by the signal analysis module 1313 to correlate a sequence of detected signals to a multi-pulse sequence of emitted light pulses and to output a 3D point cloud image. In some cases, the signal analysis module 1313 may comprise a filter to identify a temporal profile in the returned signals that match the temporal profile of the emitted sequence of signals thereby associating the sequence of return signals to the emitted sequence of light pulses. In some cases, the signal analysis module 1313 may also be capable of obtaining one or more real-time conditions thereby determining a temporal profile and/or one or more parameters for adjusting a sensor output signal.

In some cases, the temporal profile generator 1311 may be configured to generate a temporal profile for emitting light pulses based on real-time conditions. In some cases, for eye safety purposes, when an object is detected within a threshold distance, a light pulse with a higher peak power may not be fired (or the amplitude of the light pulse may be decreased) until no object is detected within the threshold range. In some cases, such detection may be performed by the signal analysis module 1313. In some cases, the signal analysis module 1313 may notify the temporal profile generator 1311 when an object within a threshold distance to the Lidar system is detected.

The temporal profile may be transmitted to the emitting module 1320 for generating sequences of pulses. The emitting module 1320 may comprise one or more light sources. The one or more light sources may be configured to generate laser beams or pulses of light. In some embodiments, the wavelength of the laser beam may be between 895 nm and 915 nm (e.g., 905 nm). This wavelength range may correspond to infrared light which are invisible and penetrative, which can improve the detection range of the Lidar and prevent disturbance to the environment. The wavelength of the laser beam can be in any other range depending on the specific application. In some cases, a light source may comprise at least a laser diode and a driver circuit. In some embodiments, a light source or the driver circuits may comprise a plurality of charging units controlled to emit a sequence of pulses within a short period of time or with short time intervals between sequential pulses. The sequence of light pulses may be emitted according to a temporal profile received from the temporal profile generator. In some embodiments, light pulses generated by the emitting module may be directed to one or more optical element such as a lens or lens assembly (e.g., one or more spherical lenses, cylindrical lenses, or aspheric lenses) for collimating or focusing light beams. The one or more lenses or one or more mirrors of the emitting apparatus of the Lidar system may be used to expand, focus, or collimate the output light beams. In some cases, the emitting module may comprise a laser pulse emitting device same as the device as described with respect to FIG. 7-FIG. 9. The emitting module 1320 can adopt any suitable techniques such as MEMS scanner, vertical-cavity surface-emitting laser (VCSEL), multi-line spinning Lidar and the like that may or may not require movement of the light source.

The light source may include a laser diode. The light source may include any suitable type of lasers, such as for example, a Fabry-Perot laser diode, a quantum well laser, a distributed Bragg reflector (DBR) laser, a distributed feedback (DFB) laser, a fiber-laser module or a vertical-cavity surface-emitting laser (VCSEL).

The receiving module 1330 may comprise one or more detectors configured to receive the echo beams or return signals. In some cases, a detector may correspond to one laser and may be configured to receive light originated from the corresponding laser light source. A detector may be a photoreceiver, optical receiver, optical sensor, photodetector, or optical detector. In some cases, a receiving module may include one or more avalanche photodiodes (APDs) or one or more single-photon avalanche diodes (SPADs). In some cases, a receiving module may include a photosensor such as one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions). The photosensor may be a single photodetector capable of detecting photons, e.g., an avalanche photodiode, a SPAD, RCP (Resonant Cavity Photo-diodes), and the like, or several photodetectors, such as an array of SPADs, cooperating together to act as a single photosensor, often with higher dynamic range, lower dark count rate, or other beneficial properties as compared to a single large photon detection area. Each photodetector can be an active area that is capable of sensing photons, i.e., light.

In some cases, the received optical signals may be converted to electrical signals and further processed by an embedded circuit or computing unit to generate an output signal with improved signal-to-noise ratio, signal contrast and adaptation to a wide range of measurement distance. The output signal may then be processed by the signal analysis module 1313 to generate an image (i.e., "3D point cloud").

The embedded circuit or computing unit may be a pulse-detection circuit that is configured to convert the optical signal to an electrical signal. The pulse-detection circuit may be configured to generate a sensor output signal by varying the amount of received photon energy that is converted into at least one electrical signal. Alternatively, when the electrical signal corresponds to a single light pulse, the pulse-detection circuit may adjust a sensor output signal by accumulating different combinations of electrical signals for forming a given sensor output signal. In some cases, the pulse-detection circuit may generate a sensor output signal which is indicative of an amount of optical energy associated with a selected subset of the returned light pulses. The amount of photon energy may be varied by varying the number/count of returned light pulses are accumulated for forming an output signal and/or varying the selection of a subset of the returned light pulses such that the corresponding total optical energy can be selected. In some cases, the number/count of light pulses selected from an individual multi-sequence may be individually controlled such that the sensor output signal may have adjustable amplitude/intensity in a pixel by pixel fashion.

In some embodiments, the receiving module 1330 may comprise an embedded circuit or processor to generate the output signal which is indicative of an amount of optical energy associated with a subset of the returned light pulses. The amount of optical energy may be dynamically adjusted so as to avoid saturation of the sensor and/or enable measurement in various distance ranges. The embedded circuit or processor may be configured to accumulate output from the photosensor corresponding to a single pixel associated with a selected subset of light pulses. The photosensor corresponding to a single pixel may be a single photodetector capable of detecting photons, e.g., an avalanche photodiode, a SPAD, RCP, and the like, or several photodetectors, such as an array of SPADs. In some cases, the embedded circuit or processor may accumulate electrical signals (e.g., detections voltage) corresponding to a selected portion of returned echo beams and generate a sensor read-out. The embedded circuit or processor may be a field programmable gate array (FPGA), digital signal processor (DSP), an application specific integrated circuit (ASIC) or any other suitable computing device.

In some cases, the embedded circuit or processor may select a portion of received light pulses according to one or more parameters. As described elsewhere herein, the one or more parameters that determine the selection of a subset of return signals for forming a sensor read-out may be pre-set. Alternatively or in addition to, the one or more parameters may be determined dynamically according to real-time conditions such as a target/estimated measurement range (e.g., near-field obstacle detection or imaging, far-field obstacle detection or imaging), a change of temporal profile of the emitted signals, and/or eye safety restriction.

In some cases, the one or more parameters may be determined by the control unit 1310. For example, the control unit 1310 may generate one or more parameters for adjusting an amplitude or intensity of a sensor output signal based on the temporal profile of the multi-pulse sequence and/or a prior distance measurement generated by the signal analysis module 1313. As described above, the temporal profile of a sequence may be defined by the number of pulses, time intervals, duration of the sequence, amplitude of the pulses, or a combination thereof in a sequence. In some cases, one or more parameters may be generated based on the temporal profile of the multi-pulse sequence and one or more real-time conditions extracted from the detection and measurement generated by the signal analysis module 1313. The one or more real-time conditions may comprise an estimated measurement range, an object detected in the near field and the like. In some cases, the number of pulses or selection of pulses accumulated for forming a signal may be determined based on the detection range. For example, a greater number of pulses may be accumulated for measurement in a long distance and a smaller number of pulses may be accumulated for measurement in short distance or higher reflection scenario. In another example, when an object located in a near-filed is detected, fewer light pulses may be selected or a light pulse with a lower peak power may be selected for outputting a sensor signal.

The one or more parameters may comprise, for example, a parameter indicative of a selected subset of pulses. For instance, the one or more parameters may comprise the count of pulses accumulated for forming a sensor output signal or a parameter indicating a combination of pulses selected for forming a sensor output signal. The one or more parameters can include any other factors (e.g., a time window during which returned light pulses are received) that may determine the total optical energy of the selected subset of pulses. The control unit 1310 may transmit the one or more parameters to the receiving module 1330 for generating a sensor output signal.

The signal analysis module 1313 may receive the sensor output signal from the receiving module and generate an image. In some cases, the signal analysis module 1313 may be configured to correlate the return signals to the sequence of measurement signals and calculate a distance based on the delay time between the correlated signals. In some embodiments, a distance may be calculated using the time of flight associated the multi-pulse sequence. In some cases, the time of flight associated with the multi-pulse sequence may be determined using the average of time of flight associated with each pulse within a sequence. The signal analysis module 1313 may calculate a distance based on a time of flight associated with the subset of the light pulses, and the time of flight may be determined by determining a match between the sequence of detected light pulses and the temporal profile.

It should be noted that the provided methods and devices can be applied to any type of Lidar system. For example, the Lidar system may be a multi-line spinning Lidar system that the Lidar system may produce multi-line by multiplexing the same or a group of lenses with multiple laser sources, arranged at different heights on the focal plane of the lens. In another example, the Lidar system may be a multi-beam flash Lidar system or non-spinning Lidar system (e.g., MEMS scanner Lidar, optical phased array Lidar, etc).

The functions, methods or the one or more components described such as the temporal profile generator, signal analysis module may be implemented using software, hardware or firmware or a combination thereof. In some embodiments, the components such as temporal profile generator, receiving module, emitting module, signal analysis module may comprise one or more processors and at least one memory for storing program instructions. The processors may be disposed inside the Lidar system. Alternatively, the processors may be external to the Lidar system but in communication with the Lidar system. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. The temporal profile generator may be a standalone device or system that is in communication with the Lidar system. Alternatively, the temporal profile generator may be a component of the Lidar system. The methods disclosed herein such as dual-pulse measurement method and/or high-dynamic range output signal generation processes can be implemented in hardware components or combinations of hardware and software such as, for example, ASICs, special purpose computers, or general purpose computers.

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

Whenever the term "at least," "greater than," or "greater than or equal to" precedes the first numerical value in a series of two or more numerical values, the term "at least," "greater than" or "greater than or equal to" applies to each of the numerical values in that series of numerical values.

For example, greater than or equal to 1, 2, or 3 is equivalent to greater than or equal to 1, greater than or equal to 2, or greater than or equal to 3.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A light detection and ranging system, comprising:
   a laser pulse emitting device configured to emit a plurality of laser pulses for obtaining ranging information of one spot in a three-dimensional environment, wherein the plurality of laser pulses include a first laser pulse and a second laser pulse separated by a predetermined time interval that is greater than a time delay corresponding to a near-field measurement distance and wherein the second laser pulse has a power greater than the power of the first laser pulse; and
   a receiving device configured to:
   (i) detect waveforms associated with the plurality of reflected laser pulses;
   (ii) generate a distance measurement output corresponding to the one spot in the three-dimensional environment by analyzing the detected waveforms.

2. The light detection and ranging system of claim 1, wherein a power of the first laser pulse is selected based at least in part on the saturation period caused by a straylight of the first laser pulse.

3. The light detection and ranging system of claim 1, wherein the detected waveforms are further associated with one or more straylight signals.

4. The light detection and ranging system of claim 3, wherein analyzing the detected waveforms comprise analyzing the reflected laser pulses relative to the one or more straylight signals.

5. The light detection and ranging system of claim 4, wherein analyzing the detected waveforms further comprises determining a presence of a clear and non-overlapping waveform following the one or more straylight signals.

6. The light detection and ranging system of claim 1, wherein the predetermined time interval is longer than a delay time for a laser pulse reflected by an object in a near-field area of the three-dimensional environment.

7. The light detection and ranging system of claim 6, wherein the laser pulse reflected by the object in the near-field area is in a measurement blind zone caused by the saturation period.

8. The light detection and ranging system of claim 1, wherein the laser pulse emitting device comprises a waveform generator and a laser.

9. The light detection and ranging system of claim 8, wherein the laser is a semiconductor laser and configured for emitting the first laser pulse and the second laser pulse based on a drive current outputted by the waveform generator.

10. The light detection and ranging system of claim 1, wherein the near-field measurement distance is no greater than 50 meters.

11. A method for imaging using a light detection and ranging system comprising:
    emitting a plurality of laser pulses for obtaining ranging information of one spot in a three-dimensional environment, wherein the plurality of laser pulses include a first laser pulse and a second laser pulse separated by a predetermined time interval that is greater than a time delay corresponding to a near-field measurement distance and wherein the second laser pulse has a power greater than the power of the first laser pulse;
    detecting waveforms associated with the plurality of reflected laser pulses; and
    analyzing the detected waveforms to generate a distance measurement output corresponding to the one spot in the three-dimensional environment.

12. The method of claim 11, wherein a power of the first laser pulse is selected based at least in part on the saturation period caused by a straylight of the first laser pulse.

13. The method of claim 11, wherein the detected waveforms are further associated with one or more straylight signals.

14. The method of claim 13, wherein analyzing the detected waveforms comprise analyzing the reflected laser pulses relative to the one or more straylight signals.

15. The method of claim 14, wherein analyzing the detected waveforms further comprises determining a presence of a clear and non-overlapping waveform following the one or more straylight signals.

16. The method of claim 11, wherein the predetermined time interval is longer than a delay time for a laser pulse reflected by an object in a near-field area of the three-dimensional environment.

17. The method of claim 11, wherein the laser pulse reflected by the object in the near-field area is in a measurement blind zone caused by the saturation period.

18. The method of claim 11, wherein the plurality of laser pulses are emitted by an emitting device comprising a waveform generator and a laser.

19. The method of claim 18, wherein the laser is a semiconductor laser and configured for emitting the first laser pulse and the second laser pulse based on a drive current outputted by the waveform generator.

* * * * *